(12) United States Patent
Davis et al.

(10) Patent No.: US 11,346,382 B2
(45) Date of Patent: May 31, 2022

(54) MODULAR FURNITURE WITH STRESSED DOVETAIL TAB JOINT

(71) Applicant: Clark Evan Davis, Genola, UT (US)

(72) Inventors: Clark Evan Davis, Provo, UT (US); Paul Schmidt, Provo, UT (US)

( * ) Notice: Subject to any disclaimer, the term of this patent is extended or adjusted under 35 U.S.C. 154(b) by 841 days.

(21) Appl. No.: 16/104,906

(22) Filed: Aug. 18, 2018

(65) Prior Publication Data

US 2019/0059593 A1 Feb. 28, 2019

Related U.S. Application Data

(60) Provisional application No. 62/552,247, filed on Aug. 30, 2017.

(51) Int. Cl.
  *F16B 12/12* (2006.01)
  *F16B 5/00* (2006.01)
  *A47C 4/02* (2006.01)

(52) U.S. Cl.
  CPC ............ *F16B 12/125* (2013.01); *A47C 4/021* (2013.01); *F16B 5/0052* (2013.01); *A47B 2230/0077* (2013.01); *F16B 2200/30* (2018.08)

(58) Field of Classification Search
  CPC .......... A47B 47/042; A47B 2230/0074; A47B 2230/0077; A47B 2230/0081; A47C 4/021; A63H 33/105; F16B 5/0012; F16B 5/0052; F16B 12/125; F16B 12/46; F16B 2012/046; F16B 2012/466; F16B 2200/30; Y10T 403/7094
  USPC ....................................................... 403/381
  See application file for complete search history.

(56) References Cited

U.S. PATENT DOCUMENTS

| | | | |
|---|---|---|---|
| 456,353 | A * | 7/1891 | Bower ................. B65D 85/327 |
| | | | 217/32 |
| 919,257 | A | 4/1909 | Seydewitz |
| 981,532 | A | 1/1911 | Cary |
| 1,061,297 | A | 5/1913 | Johnson |
| 1,419,647 | A | 6/1922 | Shepherdson |
| 1,431,823 | A | 10/1922 | Georges |
| 1,747,900 | A | 2/1930 | Jenny |
| 1,903,631 | A | 4/1933 | Morrison |

(Continued)

FOREIGN PATENT DOCUMENTS

| | | |
|---|---|---|
| CA | 1255355 | 6/1989 |
| CH | 281702 | 3/1952 |

(Continued)

OTHER PUBLICATIONS

Celery Rocking Chair viewed at http://www.eroomservice.com/manufacturer/celery/ circa Dec. 3, 2011.

(Continued)

*Primary Examiner* — Josh Skroupa
(74) *Attorney, Agent, or Firm* — Brett Peterson; Pate Peterson PLLC

(57) ABSTRACT

An improved joint is provided for modular furniture. The joint includes a dovetail shaped tab and a corresponding slot. The tab is held in the slot such that the tab is maintained in an elastically bent position while the item of modular furniture is in an assembled configuration. The tab and slot provides increased stiffness and rigidity to the piece of furniture while allowing the piece of furniture to be assembled without fasteners such as screws or nails.

20 Claims, 16 Drawing Sheets

(56) References Cited

U.S. PATENT DOCUMENTS

| | | |
|---|---|---|
| 1,940,117 A | 12/1933 | Carpos |
| 1,981,646 A | 11/1934 | Hamley |
| 2,240,256 A | 4/1941 | Elmendorf |
| 2,279,864 A | 4/1942 | Eide |
| 2,334,912 A | 11/1943 | Eide |
| 2,369,930 A | 2/1945 | Wagner |
| D144,730 S | 5/1946 | Perrault |
| 2,418,731 A | 4/1947 | Seitz |
| 2,479,086 A | 8/1949 | Silverman |
| 2,481,671 A | 9/1949 | John et al. |
| 2,486,987 A | 11/1949 | Scarlett |
| 2,518,955 A | 8/1950 | Stelzer |
| 2,534,413 A | 12/1950 | Cenis |
| 2,551,071 A | 5/1951 | Tyncs |
| D164,552 S | 9/1951 | Curtis |
| 2,595,002 A | 4/1952 | Schneider |
| 2,602,012 A | 7/1952 | Doty |
| 2,615,771 A | 10/1952 | Curtis |
| 2,632,498 A | 3/1953 | Curtis |
| 2,672,181 A | 3/1954 | Rose |
| 2,677,491 A | 5/1954 | Burger |
| 2,703,724 A | 3/1955 | Der Yuen |
| 2,720,253 A | 10/1955 | Turner |
| 2,745,591 A | 5/1956 | Holt |
| 2,786,789 A | 3/1957 | Carlson |
| 2,792,877 A | 5/1957 | West |
| 2,801,895 A | 8/1957 | Gass |
| 2,825,101 A | 3/1958 | Rubsnstein |
| 3,053,598 A | 9/1962 | Cheslow |
| 3,089,675 A | 5/1963 | Lozier |
| 3,149,880 A | 9/1964 | Steuer |
| 3,186,027 A | 6/1965 | Merillat |
| 3,262,405 A | 7/1966 | Sutton |
| 3,300,170 A | 1/1967 | Charles |
| 3,300,245 A | 1/1967 | Rumble |
| D212,601 S | 11/1968 | Rubsnstein |
| 3,527,497 A | 9/1970 | Self |
| 3,547,491 A | 12/1970 | Bovasso |
| 3,578,385 A | 5/1971 | Stiglitz |
| 3,603,274 A | 9/1971 | Ferdinand |
| 3,603,656 A | 9/1971 | Ferman |
| 3,636,893 A | 1/1972 | Lange |
| 3,674,328 A | 7/1972 | White et al. |
| 3,684,285 A | 8/1972 | Kane |
| 3,697,363 A | 10/1972 | Martinez |
| 3,783,801 A | 1/1974 | Engman |
| 3,788,700 A | 1/1974 | Wartes |
| 3,812,977 A | 5/1974 | Glassman |
| 3,831,533 A | 8/1974 | Kellogg |
| 3,847,435 A | 11/1974 | Skinner |
| 4,021,128 A | 5/1977 | Chiames |
| 4,055,924 A | 11/1977 | Beaver |
| D247,596 S | 3/1978 | Osamu |
| 4,082,356 A | 4/1978 | Johnson |
| 4,099,472 A | 7/1978 | Kellogg |
| 4,103,818 A | 8/1978 | Raubenheimer |
| 4,140,065 A | 2/1979 | Chacon |
| 4,153,311 A | 5/1979 | Takhasaki |
| 4,158,277 A | 6/1979 | Krempp et al. |
| 4,188,067 A | 2/1980 | Elmer |
| 4,191,113 A | 3/1980 | Hogberg |
| 4,202,581 A | 5/1980 | Fleishman |
| 4,225,180 A | 9/1980 | Gillis |
| 4,258,464 A | 3/1981 | Ullman |
| 4,348,052 A | 9/1982 | Roland |
| 4,358,047 A * | 11/1982 | Raubenheimer ... B65D 5/48038 217/32 |
| 4,390,204 A | 6/1983 | Fleishman |
| 4,419,028 A | 12/1983 | Roland |
| 4,433,753 A | 2/1984 | Watson |
| 4,433,843 A | 2/1984 | Bricco |
| 4,492,332 A | 1/1985 | Collins |
| 4,501,512 A | 2/1985 | Hiltz |
| 4,509,794 A | 4/1985 | Roland |
| 4,533,174 A | 8/1985 | Fleishman |
| 4,544,092 A | 10/1985 | Palmer |
| 4,548,350 A | 10/1985 | Engle |
| 4,574,917 A | 3/1986 | Stoddard |
| 4,591,090 A | 5/1986 | Collins |
| 4,593,950 A | 6/1986 | Vittorio |
| 4,595,105 A | 6/1986 | Gold |
| D289,234 S | 4/1987 | Hoult |
| 4,685,609 A | 8/1987 | Ferrari |
| 4,706,573 A | 11/1987 | Sielaff |
| 4,712,837 A | 12/1987 | Swilley |
| 4,759,449 A | 7/1988 | Gold |
| D299,087 S | 12/1988 | Bruce |
| 4,841,878 A | 6/1989 | Kriegsman |
| D302,216 S | 7/1989 | Roland |
| 4,846,530 A | 7/1989 | Noble |
| 4,867,327 A | 9/1989 | Roland |
| 4,878,439 A | 11/1989 | Samson |
| 4,884,420 A | 12/1989 | Finkel |
| 4,926,759 A | 5/1990 | Vitsky et al. |
| 4,934,765 A | 6/1990 | Slifer |
| 5,011,228 A | 4/1991 | Marcantel |
| 5,069,144 A | 12/1991 | Williford |
| 5,082,329 A | 1/1992 | Mars |
| 5,253,594 A | 10/1993 | Sideris |
| 5,253,595 A | 10/1993 | Heidmann |
| 5,263,766 A | 11/1993 | McCullough |
| 5,275,467 A | 1/1994 | Kawecki |
| 5,343,816 A | 9/1994 | Sideris |
| 5,354,589 A | 10/1994 | Waas |
| 5,367,964 A | 11/1994 | Hockensmith |
| 5,387,027 A | 2/1995 | Maloney |
| 5,454,331 A | 10/1995 | Green |
| 5,478,145 A | 12/1995 | Kamachi |
| 5,605,378 A | 2/1997 | Oyediran |
| 5,613,449 A | 3/1997 | Pullman |
| 5,644,995 A | 7/1997 | Gurwell et al. |
| 5,655,812 A | 8/1997 | Albecker |
| 5,706,741 A | 1/1998 | Thorp |
| 5,720,537 A | 2/1998 | Lutz |
| 5,752,611 A | 5/1998 | Nakagawa |
| 5,765,922 A | 6/1998 | Hsia |
| 5,803,548 A | 9/1998 | Battle |
| 5,803,561 A | 9/1998 | Puehlhorn |
| 5,881,653 A | 3/1999 | Pfister |
| 5,901,521 A | 5/1999 | Guy |
| 5,921,631 A | 7/1999 | Bush |
| 5,927,816 A | 7/1999 | Hsu |
| 5,941,377 A | 8/1999 | Hart |
| 5,992,938 A | 11/1999 | Jones |
| 6,029,584 A | 2/2000 | Cochrane |
| 6,036,270 A | 3/2000 | Bufalini |
| 6,041,920 A | 3/2000 | Hart |
| D422,799 S | 4/2000 | Dworshak et al. |
| 6,053,585 A | 4/2000 | Osen |
| 6,109,695 A | 8/2000 | Kahwaji |
| 6,126,022 A | 10/2000 | Merkel |
| 6,155,641 A | 12/2000 | Frost |
| 6,174,116 B1 | 1/2001 | Brand |
| 6,189,974 B1 | 2/2001 | Beck |
| 6,247,754 B1 | 6/2001 | Vanderaue et al. |
| 6,283,564 B1 | 9/2001 | Corson |
| 6,347,772 B1 | 2/2002 | L'Hotel |
| 6,378,707 B1 | 4/2002 | Taggert |
| 6,443,076 B1 | 9/2002 | Case |
| 6,532,878 B2 | 3/2003 | Tidemann |
| 6,595,378 B2 | 7/2003 | Wang |
| 6,615,746 B2 | 9/2003 | Bart |
| 6,615,999 B1 | 9/2003 | Culp |
| 6,619,749 B2 | 9/2003 | Willy |
| 6,675,979 B2 | 1/2004 | Taylor |
| 6,769,369 B1 | 8/2004 | Brandenberg |
| 6,807,912 B2 | 10/2004 | Willy |
| D499,577 S | 12/2004 | Willy |
| 6,845,871 B1 | 1/2005 | Culp |
| 6,848,747 B1 | 2/2005 | Robinson |
| 6,895,870 B1 | 5/2005 | Bizlewicz |
| 6,955,401 B1 | 10/2005 | Shoulberg |
| 6,994,222 B2 | 2/2006 | Hunt |
| 7,066,548 B2 | 6/2006 | Butler |

(56) References Cited

U.S. PATENT DOCUMENTS

| | | |
|---|---|---|
| 7,114,300 B1 | 10/2006 | Culp |
| 7,168,766 B2 | 1/2007 | Pelletier |
| 7,219,962 B2 | 5/2007 | Stone |
| D547,076 S | 7/2007 | Hughes et al. |
| 7,255,403 B2 | 8/2007 | Butler |
| 7,300,110 B1 | 11/2007 | Debien |
| 7,386,960 B2 | 6/2008 | Molteni |
| 7,533,940 B1 | 5/2009 | Zook |
| 7,631,605 B2 | 12/2009 | Willy |
| 7,765,942 B2 | 8/2010 | Choi |
| 7,856,772 B1 | 12/2010 | Culp et al. |
| 8,123,311 B2 | 2/2012 | Nilsson |
| 8,167,377 B2 | 5/2012 | Kovach |
| 8,215,245 B2 | 7/2012 | Morrison |
| 8,220,399 B2 | 7/2012 | Berent et al. |
| 8,332,917 B2 | 12/2012 | Forster |
| 8,459,476 B2 | 6/2013 | Malekmadani |
| 8,590,976 B2 | 11/2013 | Davis |
| 8,651,298 B2 | 2/2014 | Beaty |
| 8,667,911 B2 | 3/2014 | Brandenberg |
| 8,863,470 B2 | 10/2014 | Bottorff |
| 9,220,994 B2 * | 12/2015 | Murphy ............... A63H 33/105 |
| 9,277,814 B2 | 3/2016 | Winker |
| 9,282,819 B2 | 3/2016 | Blake |
| 9,447,804 B2 | 9/2016 | Andersson |
| 9,534,623 B2 | 1/2017 | Anderson et al. |
| 9,615,663 B2 | 4/2017 | Davis |
| 9,668,573 B2 | 6/2017 | Salani |
| 9,706,836 B1 | 7/2017 | Nelson |
| 9,719,542 B2 * | 8/2017 | Cappelle ............... F16B 12/125 |
| 10,138,917 B2 | 11/2018 | Koch |
| 10,227,162 B2 | 3/2019 | Davis |
| 10,660,433 B1 | 5/2020 | Jomaa |
| 2003/0107255 A1 | 6/2003 | Willy |
| 2004/0056526 A1 | 3/2004 | Willy |
| 2004/0227041 A1 | 11/2004 | Lewis |
| 2007/0169429 A1 | 7/2007 | Wu |
| 2007/0187348 A1 | 8/2007 | Malekmadani |
| 2008/0074013 A1 | 3/2008 | Ahlgrim et al. |
| 2008/0302748 A1 | 12/2008 | Tsai |
| 2009/0066140 A1 | 3/2009 | Berent et al. |
| 2009/0084740 A1 | 4/2009 | Lin |
| 2010/0003077 A1 | 1/2010 | Kelley |
| 2012/0080910 A1 | 4/2012 | Davis |
| 2013/0062294 A1 | 3/2013 | Beaty |
| 2013/0080286 A1 | 3/2013 | Rotholz |
| 2013/0170904 A1 | 7/2013 | Cappelle |
| 2014/0048176 A1 | 2/2014 | Susnjara |
| 2014/0048177 A1 | 2/2014 | Susnjara |
| 2014/0059829 A1 | 3/2014 | Weber |
| 2014/0186104 A1 | 7/2014 | Hamberger |
| 2014/0263130 A1 | 9/2014 | Davis |
| 2015/0230600 A1 | 8/2015 | Schulte |
| 2015/0335155 A1 | 11/2015 | Winker |
| 2017/0023043 A1 | 1/2017 | Koelling et al. |
| 2017/0079426 A1 | 3/2017 | Davis |
| 2017/0086578 A1 | 3/2017 | Nowak |
| 2017/0099961 A1 | 4/2017 | Church |
| 2017/0265650 A1 | 9/2017 | Adair |
| 2017/0321734 A1 | 11/2017 | Maertens |
| 2017/0340107 A1 * | 11/2017 | Shen ..................... F16B 12/125 |
| 2018/0112696 A1 | 4/2018 | Davis |
| 2019/0038023 A1 | 2/2019 | Stocker |
| 2019/0040890 A1 | 2/2019 | Davis |
| 2019/0059593 A1 | 2/2019 | Davis |
| 2019/0059594 A1 | 2/2019 | Davis |
| 2019/0085886 A1 | 3/2019 | Davis |
| 2019/0107131 A1 | 4/2019 | Davis |
| 2019/0254424 A1 | 8/2019 | Rassat |
| 2020/0370585 A1 | 11/2020 | Huang |

FOREIGN PATENT DOCUMENTS

| | | |
|---|---|---|
| DE | 1529719 | 5/1969 |
| DE | 2100168 | 11/1972 |
| DE | 3925302 | 2/1991 |
| DE | 9201692 | 4/1992 |
| DE | 29914896 | 12/1999 |
| DE | 29906711 | 1/2000 |
| DE | 102007058662 | 6/2009 |
| DE | 102014006155 | 10/2014 |
| EP | 0299695 | 1/1989 |
| FR | 1300853 | 8/1962 |
| FR | 2634991 | 2/1990 |
| FR | 2654164 | 5/1991 |
| GB | 143840 | 12/1920 |
| GB | 810752 | 3/1959 |
| GB | 2353080 | 2/2001 |
| NL | 1025719 | 9/2005 |
| WO | WO 2005-085656 | 9/2005 |

OTHER PUBLICATIONS

PlyGrid Shelves viewed at http://offi.com/products/offikids/PLYGRID.php?p2c=249 circa Dec. 3, 2011.
Snap Table viewed at http://www.offi.com/pdfs/snaptable.pdf circa Dec. 3, 2011.
Furniture viewed at http://www.playatech.com/product_list.php circa Dec. 3, 2011.
Arabic Table viewed at http://www.plydea.com/support/assemblypdf.html circa Dec. 3, 2011.
Blue7Chair viewed at http://www.plydea.com/support/assemblypdf.html circa Dec. 3, 2011.
First Desk viewed at http://www.plydea.com/support/assemblypdf.html circa Dec. 3, 2011.
Rinaldo Chair viewed at http://www.plydea.com/support/assemblypdf.html circa Dec. 3, 2011.
Tuffet Stool viewed at http://www.plydea.com/support/assemblypdf.html circa Dec. 3, 2011.
WasteNot Basket viewed at http://www.plydea.com/support/assemblypdf.html circa Dec. 3, 2011.
Winehold Wine Rack viewed at http://www.plydea.com/support/assemblypdf.html circa Dec. 3, 2011.

* cited by examiner

MODULAR FURNITURE WITH STRESSED DOVETAIL TAB JOINT

RELATED APPLICATIONS

The present application claims the benefit of U.S. Provisional Application Ser. No. 62/552,247, filed Aug. 30, 2017, which is hereby incorporated by reference in its entirety.

THE FIELD OF THE INVENTION

The present invention relates to furniture. In particular, examples of the present invention relate to a modular furniture joint which allows tool-less assembly and increased stability. The present invention provides modular furniture joints with greater pull-out strength, easier manufacturing, and greater ease of assembly. The joint can be assembled by inserting a panel either backwards or forwards, and is less susceptible to material or manufacturing variation.

BACKGROUND

Many persons desire modular furniture. Modular furniture is often assembled by the end user from flat pieces and is thus easy to store and transport in the un-assembled form. Modular furniture often suffers from instability, and in some instances modular furniture is made overly complex or uses more permanent fastening or construction methods to stabilize the furniture. This, however, makes the furniture more cumbersome for the end user and reduces some of the portability and ease of use associated with this type of furniture. Additionally, the use of fasteners such as screws or nails to stabilize the furniture is often problematic in the long term as these fasteners become loose with use and movement of the furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1A:
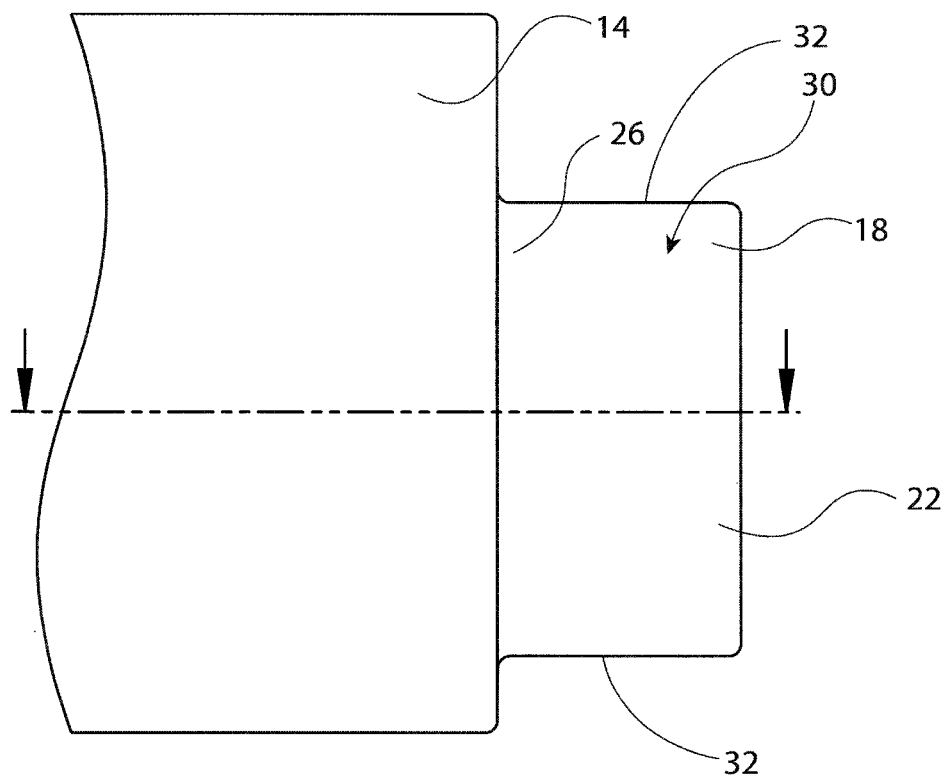
FIG. 1A shows a side view drawing of a panel and tab.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help to improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art and that the drawings are not necessarily drawn to scale.

The present disclosure describes how an item of modular furniture such as a cabinet, drawer, chair, bench, etc. may be constructed with a joint which includes a first panel with a dovetail tab and a second panel with a corresponding dovetail slot. The slot may be formed with an open insertion section and a retention section which is narrower and curved. The curved retention section of the slot causes the dovetail tab to be maintained in a bent configuration when disposed in the retention section of the slot. The tab is bent out of plane along its length (relative to the face of the panel from which the tab is cut). The furniture panels are formed from a stiff material which may also flex elastically. Plywood, such as ¼ inch or ½ inch birch plywood, is an example material from which the present invention may be made.

The illustrated dovetail joint may be used in a variety of different items of modular furniture such as a bookcase or shelving unit, a box, a desk, etc. These items of modular furniture are typically constructed from flat panels of a material such as plywood to allow for convenient storage and shipping. Accordingly, the joint may be formed between two flat panels which are joined to each other at an angle such that the first panel intersects the second panel. Often, the first panel is perpendicular to the second panel.

The first panel includes a dovetail tab which is formed so that the tab is in the plane of the panel. The tab has an inclined face on both of the major faces, so that the dovetail tab is thinner at the base of the tab and thicker at the end of the tab. The tab and first panel form part of a piece of modular furniture. A second panel is formed with a slot which receives the dovetail tab. The slot is formed into a face of the second panel and is formed with an open insertion section which is large enough to accept the tab transversely into the slot and a retaining section which engages the tab and prevents the tab from pulling transversely out of the slot. For a slot which is contained on a face of a panel, the insertion section of the slot is made large enough to accept the end of the tab and the tab is inserted into the insertion section in a direction perpendicular to the length of the slot. The tab is then moved along the length of the slot into the retaining section of the slot.

If the opening to the slot is on an end of the slot (such as on an edge of a panel), the opening is made large enough to accept the front profile of the tab. The tab is inserted into the opening in a direction parallel to the length of the slot and is moved into the retention section of the slot.

The slot may be shaped such that the width of the slot is wider than the thickness of the tab at a point in the retention section of the slot where the tab is located when the joint is fully assembled. The retention section of the slot is curved or bent and holds the tab so that the tab is bent when the joint is in an assembled state.

The retention section of the slot has angled interior sides which match the inclined faces of the dovetail tab and prevent the tab from being pulled transversely out of the slot. The straight-thru width of this section of the slot (i.e. the non-occluded width of the slot through the retention section of the slot) is less than the thickness of the tab and, in order to enter this section, the tab must bend or flex along its length and is held in a flexed (stressed) configuration while positioned in this section of the slot.

The tab can also have multiple sets of inclined faces on both side of the tab, with matching inclined faces on the curved or bent section of the slot. The tab can also have unequally inclined faces on the tab and slot, allowing for a first panel which extends from the slot and second panel at an acute or obtuse angle instead of extending perpendicular to the second panel.

If desired, the tab can also have slits formed through the middle of the tab to increase the flexibility of the tab. The tab can also have slits on the sides of the tab extending into the panel to increase the flexibility of the tab.

Figure 1B:
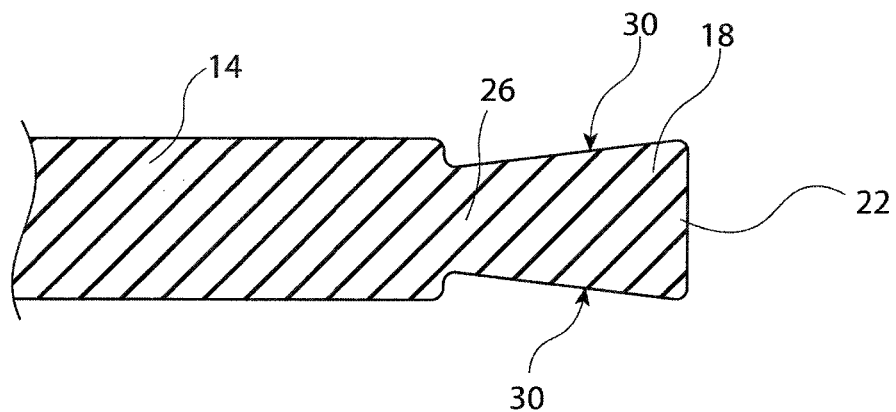
FIG. 1B shows a cross-sectional view of the panel and tab.

FIG. 1A shows a top view of a first panel 14 with a dovetail tab 18 which is formed as part of the first panel 14. The tab 18 extends from an edge of the panel 14. The panel 14 is typically formed from a material such as ½ inch plywood. The first panel 14 is only partially shown and is typically larger in both length and width and forms a section of a piece of modular furniture. For example, the first panel 14 may be a divider, side panel, or back panel which is part of a desk or bookshelf. FIG. 1B shows a cross-sectional view of the first panel 14 and dovetail tab 18. The dovetail tab 18 includes inclined faces 30 which are evident in FIG. 1B and which cause the tab 18 to have a distal end 22 which is thicker than its neck 26 (adjacent the panel edge). The tab 18 includes two edges 32 which extend between the panel 14 and the distal end 22 of the tab and also between the two opposed faces 30 of the tab.

Figure 2A:
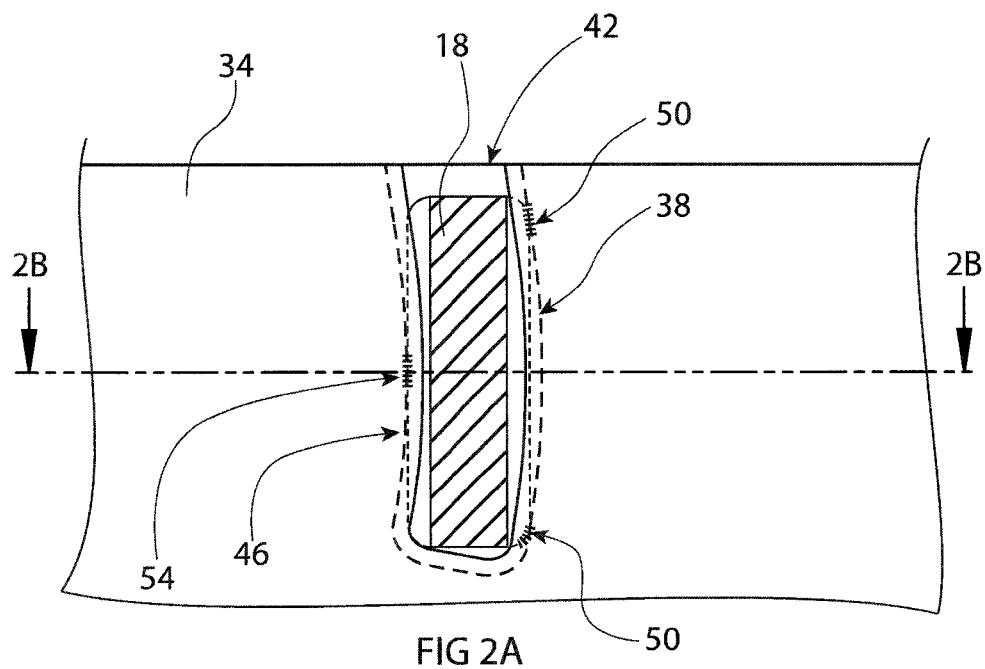
FIG. 2A shows a partial cross-sectional view of a panel, slot, and tab.
Figure 2B:
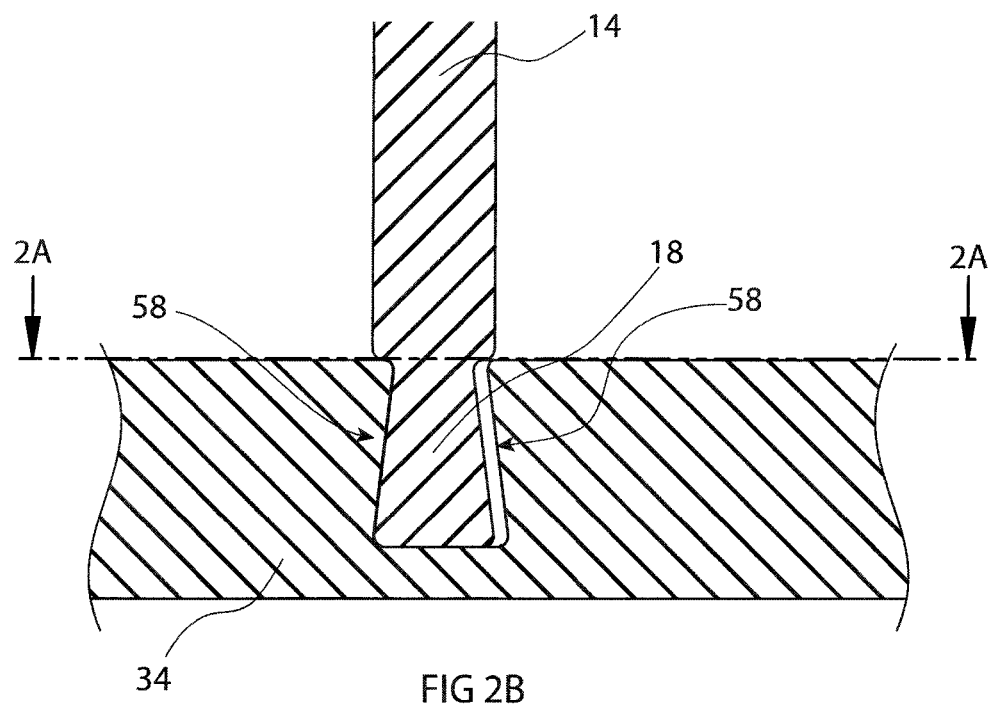
FIG. 2B shows a cross-sectional view of the panel, slot, and tab.

FIGS. 2A and 2B show an assembled joint between the first panel 14 and the second panel 34. FIG. 2A shows a cross-sectional top view of the joint taken along line 2A in FIG. 2B. The drawing shows the face of the second panel 34 with the slot 38 extending downwardly away from the page and the tab 18 is shown from a cut surface adjacent the edge of the first panel 14 and extending downwardly into the slot 38. The dovetail tab 18 is held in place in the retention section of a curved slot 38. In order to better illustrate the functionality of the joint, the curvature of the slot 38 has been exaggerated slightly and the bending of the tab 18 has been minimized. This shows the contact between the slot 38 and tab 18 and illustrates the mechanism by which the slot 38 bends the tab. In actual use, the retention portion 46 of the slot 38 may be curved to a lesser degree than is shown and the tab 18 will be bent by the contact with the slot 38. FIG. 2B shows a cross-sectional side view of the joint taken along line 2B shown in FIG. 2A. The slot 38 includes an open, insertion section 42 and a retention section 46. In the example slot 38, the insertion section 42 is an opening in the edge of the panel 34 which allows the dovetail tab 18 to be inserted into the slot 34. The retention section 46 of the slot 38 is curved. In many cases, the retention section 46 of the slot 38 need not be as curved as is shown in the drawing, but the drawing illustrates the functionality of the slot 38 and tab 18.

The slot 38 is curved so that the tab 18, when inserted into the retention section 46 of the slot 38 into the assembled configuration shown, is pinched between two spaced apart points of contact 50 near the ends of the tab 18 on a first side of the tab 18 and another point of contact 54 between the first two contact points 50 and on an opposite side of the tab 18. The tab 18 is held in a stressed configuration when the joint is fully assembled with the tab 18 being bent between the three indicated points of contact 50, 54. The tab 18 is maintained in this stressed/elastically bent configuration when the item of modular furniture is fully assembled. This adds stiffness to the modular furniture without using fasteners which typically loosen with age.

FIG. 2B shows how the slot 38 has inclined faces 58 which match the inclined faces 30 on the dovetail tab 18, preventing the tab 18 from coming out of the slot 38 in a direction perpendicular to the second panel 34. There is a space between the right side of the tab 18 and the right side of the slot 38. The retention section 46 of the slot 38 is wider than the tab 18. An unobstructed linear path through the slot 38, however, is narrower than the tab 18 causing the tab 18 to be bent by contact with the slot 38 at the points 50 and 54. The tab 18 should be sufficiently flexible to bend elastically under the force applied by points 50, 54 instead of permanently deforming the material used for the first panel 14 or second panel 34.

Figure 3A:
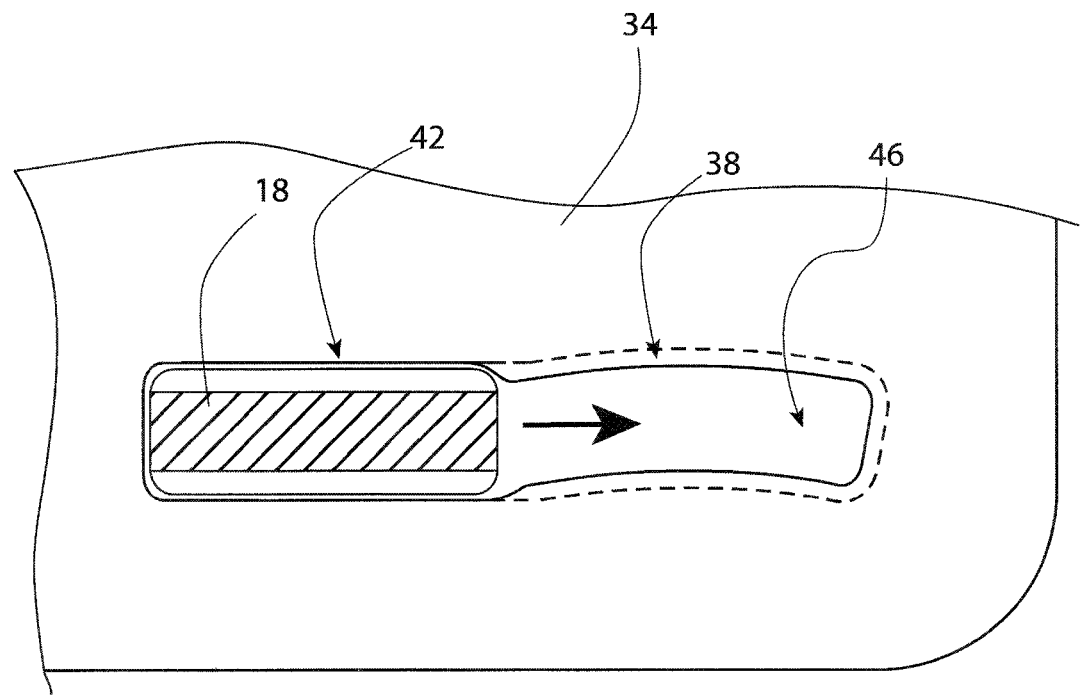
FIG. 3A shows a partial cross-sectional view of a panel, slot, and tab.

FIG. 3A shows a cross-sectional top view of the furniture joint with the dovetail/wedge tab 18 entering the insertion section 42 of the slot 38 during assembly of the associated item of furniture. As is discussed above, the joint assembles a first panel 14 and a second panel 34 in a piece of furniture. The slot 38 is formed with an open insertion section 42 on the left side of the slot 38 and a retention section 46 shown on the right of the slot 38. The insertion section 42 extends into the second panel 34 in alignment with the retention section 46 and is cut large enough to allow the dovetail tab 18 to be inserted in a direction perpendicular to the second panel 34 into the depth of the slot 38. After the tab is inserted into the insertion section 42 of the slot 38, the tab 18 is moved to the right into the retention section 46 of the slot 38. The retention section 46 is the location in the slot 38 where the tab 18 is retained in the assembled configuration of the joint. The retention section 46 is curved and causes the tab 18 to be bent along its length while located in the retention section 46.

Figure 3B:
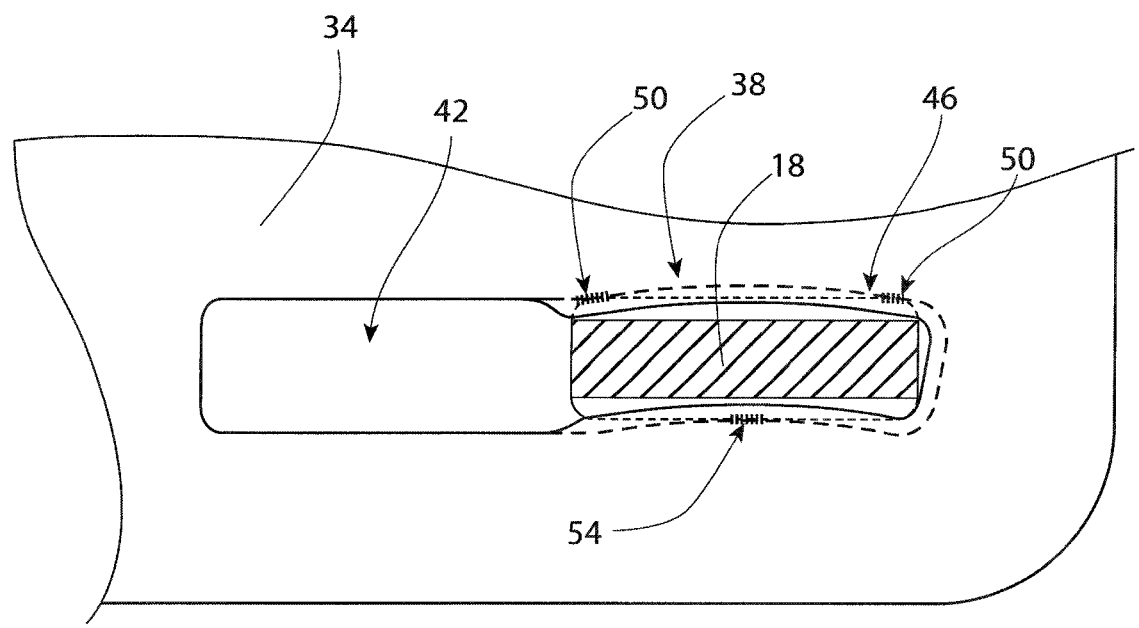
FIG. 3B shows a partial cross-sectional view of a panel, slot, and tab.

FIG. 3B shows a cross-sectional top view of the furniture joint with the dovetail tab 18 located in the curved retention section 46 of the slot 38. The curved geometry of the slot retention section 46 touches that tab 18 at two separated points 50 on one side of the tab 18 and a central point 54 on the opposite side of the tab 18 and holds the tab 18 in an elastically bent configuration while the joint is assembled.

Figure 4:
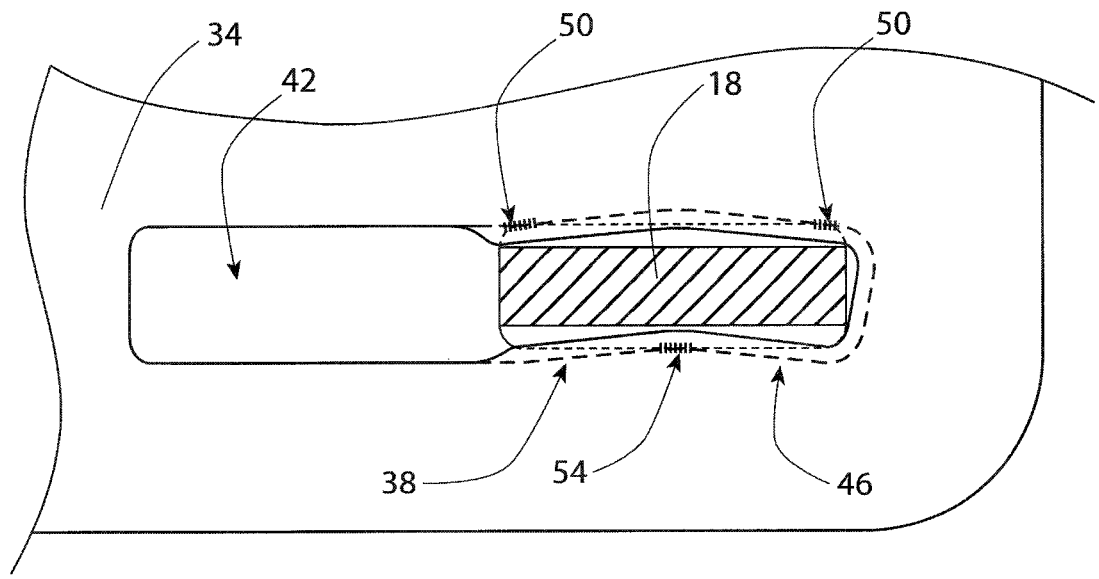
FIG. 4 shows a partial cross-sectional view of a panel, slot, and tab.

FIG. 4 shows a cross-sectional top view of the furniture joint similar to that of FIG. 3B and illustrates how the retention section 46 of the slot 38 may be shaped in a V-shape instead of a more gently curved shape as is shown in FIG. 3B. The slot 38 constrains the tab 18 in the same manner as the curved shape slot 38 shown in FIG. 3B as the tab 18 is similarly engaged by points 50 and 54. The open insertion section 42 of the slot 38 may be formed in different sizes and shapes so long as it is sufficiently large to permit insertion of the tab 18 into the slot 38.

Figure 5:
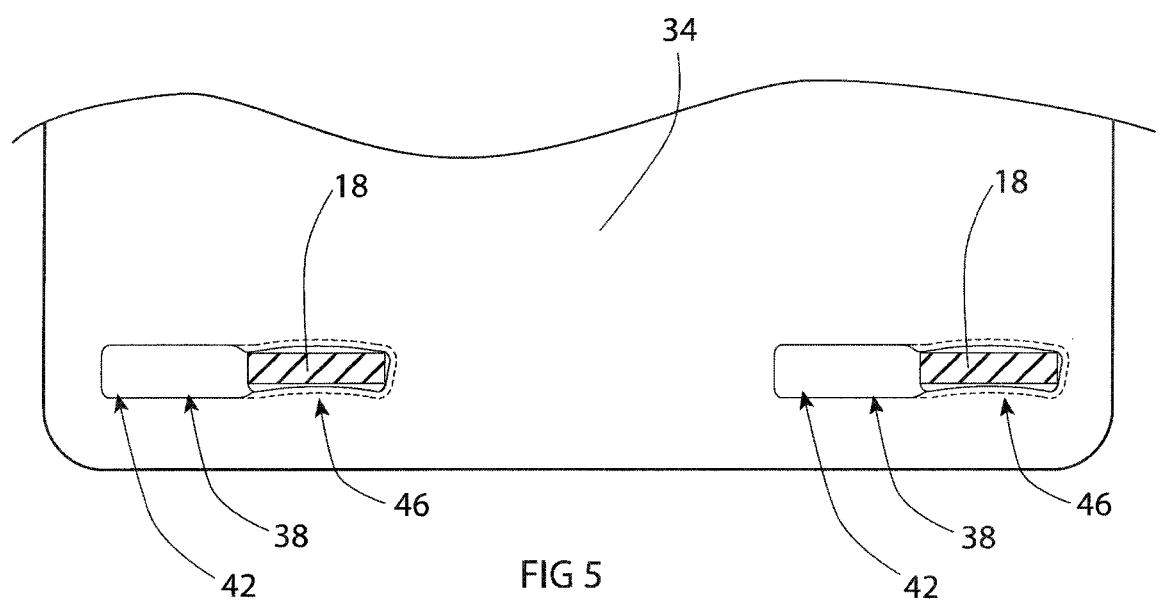
FIG. 5 shows a partial cross-sectional view of a panel, slots, and tabs.

FIG. 5 shows a cross-sectional top view of a furniture joint between a first panel 14 which has two tabs 18 and a second panel 34 which has two slots 38. The tabs 18 and slots 38 are identical to the tabs 18 and slots 38 discussed in previous figures. The second panel 34 constrains two different tabs 18 which are connected to the same first panel 14. The tab 18 and slot 38 are often used in such a configuration in modular furniture, with more than one slot and tab being used in a joint between connecting first and second furniture panels 14, 34.

Figure 6:
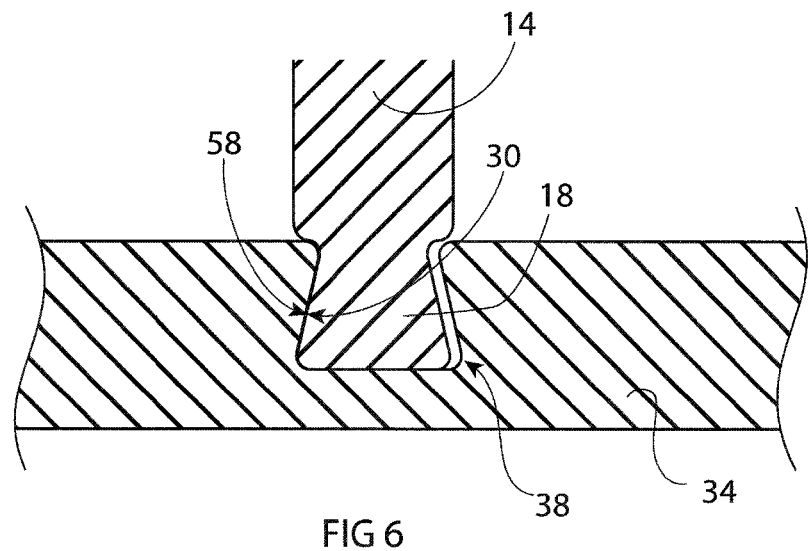
FIG. 6 shows a cross-sectional view of a panel, slot, and tab.

FIG. 6 shows a cross-sectional side view of the furniture joint view similar to that shown in FIG. 2B. This illustrates how the tab 18 and slot 38 may be shorter in length and depth and may have steeper inclined faces 30 (tab) and 58 (slot). The slot 38 may otherwise be formed in the manner shown in FIG. 3A or FIG. 4.

Figure 7:
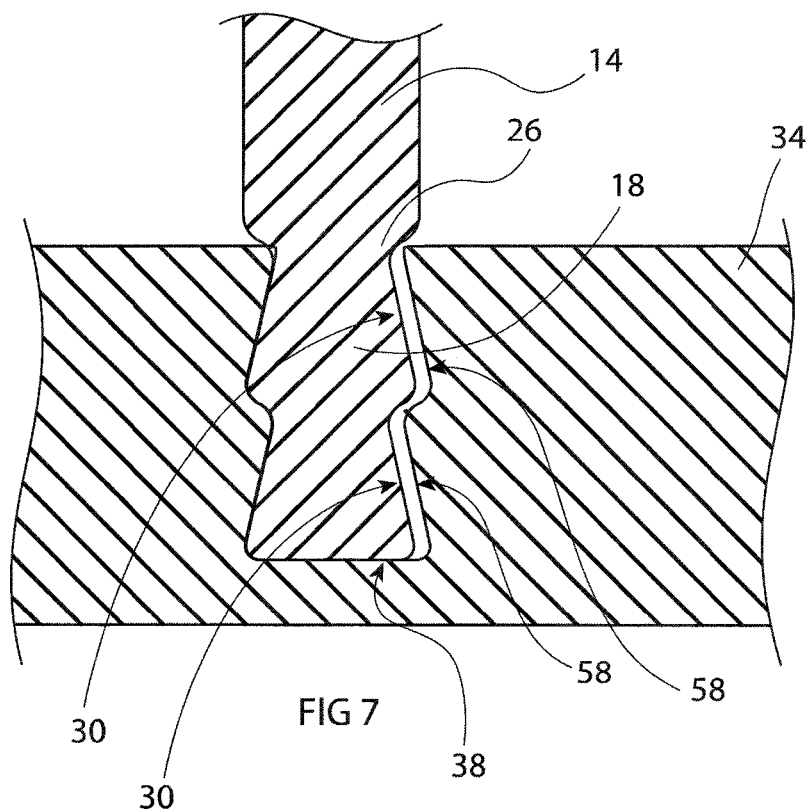
FIG. 7 shows a cross-sectional view of a panel, slot, and tab.

FIG. 7 shows a cross-sectional side view of the furniture joint view similar to that shown in FIG. 2B. This illustrates how the tab 18 and slot 38 may be longer in length and depth and also illustrates how the tab 18 and slot 38 may be formed with two sets of inclined faces 30 (tab) and 58 (slot) along the length of the tab 18 and along the depth of the slot 38 respectively. These multiple sets of inclined faces 30, 58 may provide additional joint strength by providing greater engagement between the tab 18 and the slot 38 while maintaining a steeper angle on the interface between the tab face 30 and the slot face 58 and simultaneously avoiding a tab 18 which is overly thin at the neck 26 where it attaches to the first panel 14. The slot 38 may otherwise be formed in the manner shown in FIG. 3A or FIG. 4.

Figure 8:
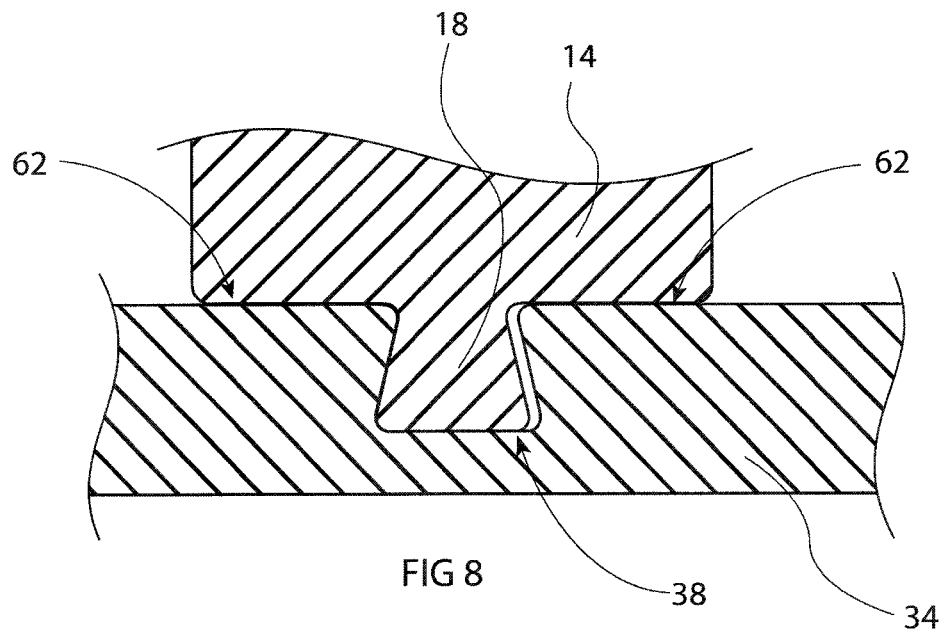
FIG. 8 shows a cross-sectional view of a panel, slot, and tab.

FIG. 8 shows a cross-sectional side view of the furniture joint view similar to that shown in FIG. 2B. This figure illustrates how the tab 18 may be formed proportionally thinner than the overall thickness of the first panel 14 from which it extends. This may be valuable in providing a broader shoulder 62 on the edge of the first panel 14 and creating a larger interface between the shoulder 62 and the face of the second panel 34. This may provide more stability against bending the first panel 14 out of a desired joint angle with respect to the second panel 34.

Figure 9:
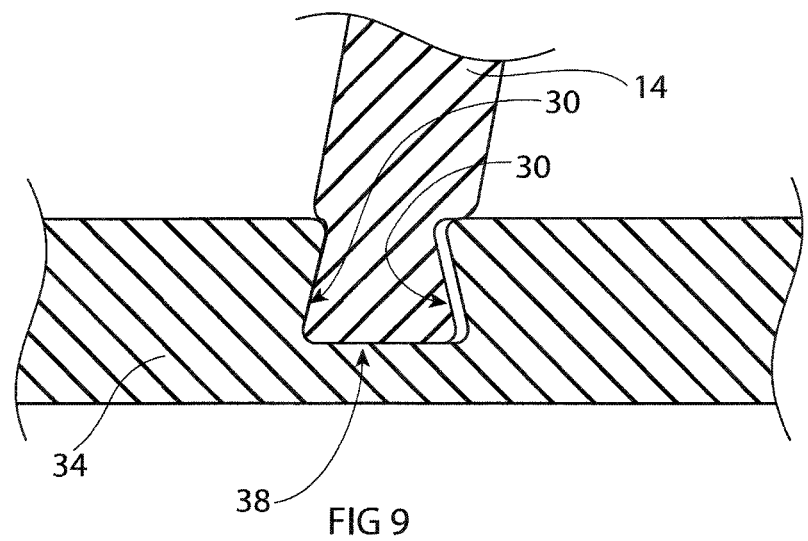
FIG. 9 shows a cross-sectional view of a panel, slot, and tab.

FIG. 9 shows a cross-sectional side view of the furniture joint view similar to that shown in FIG. 2B. This figure illustrates how the tab 18 may be formed with unequally inclined faces 30 such that the tab 18 is angled with respect to the plane of the first panel 14. The slot 38 is complementarily shaped to the tab 18. This orients the first panel 14 at an acute/obtuse angle relative to the second panel 34 and allows for different configurations of the resulting piece of modular furniture. It will be appreciated that these variations of the shape of the slot 18 and tab 38 may be applied to any of the tabs 18 and slots 38 shown above alone or in combination.

Figure 10A:
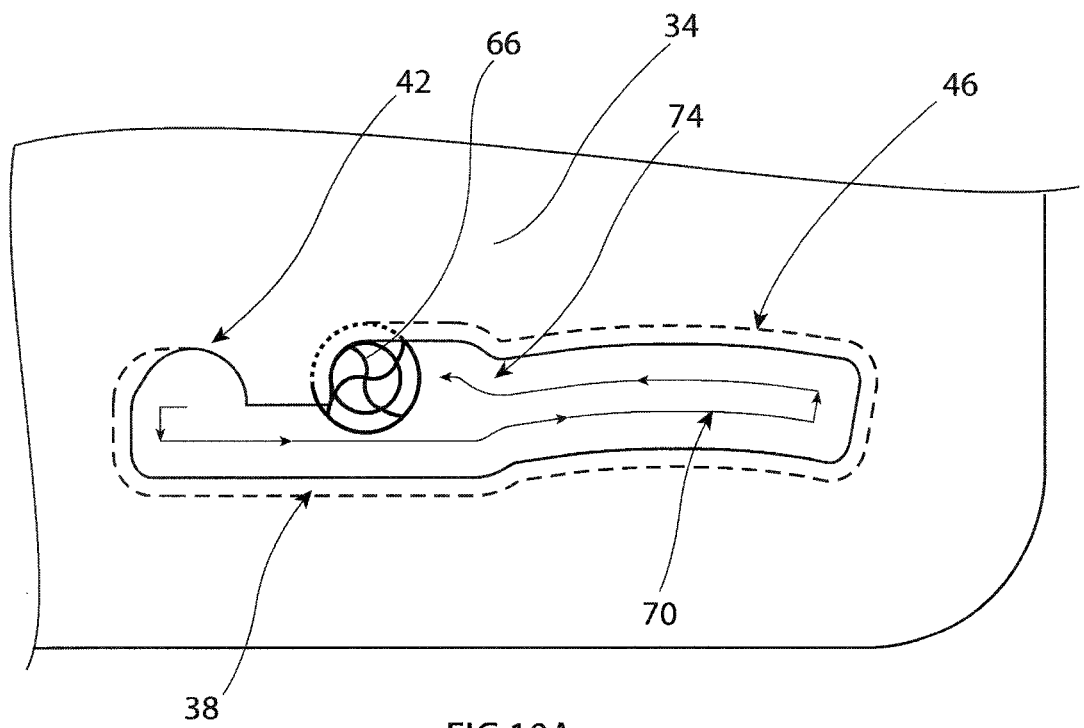
FIG. 10A shows a side view of a panel illustrating manufacture of the slot.

FIG. 10A shows a top view of the second panel 34 and slot 38. This figure illustrates how a dovetail bit 66 may be used to cut the slot 38 and also shows the tool path 70 used to cut the slot with a single dovetail bit 66, making manufacture quicker and more efficient. The dovetail bit 66 may cut a wider opening to create the insertion section 42 and a narrower curved opening to create the retention section 46. Additionally, a gradual transition section 74 may be formed between the insertion section 42 and the retention section 46 of the slot 38 to make it easier to insert the tab 18 into the retention section 46 of the slot 38.

Figure 10B:
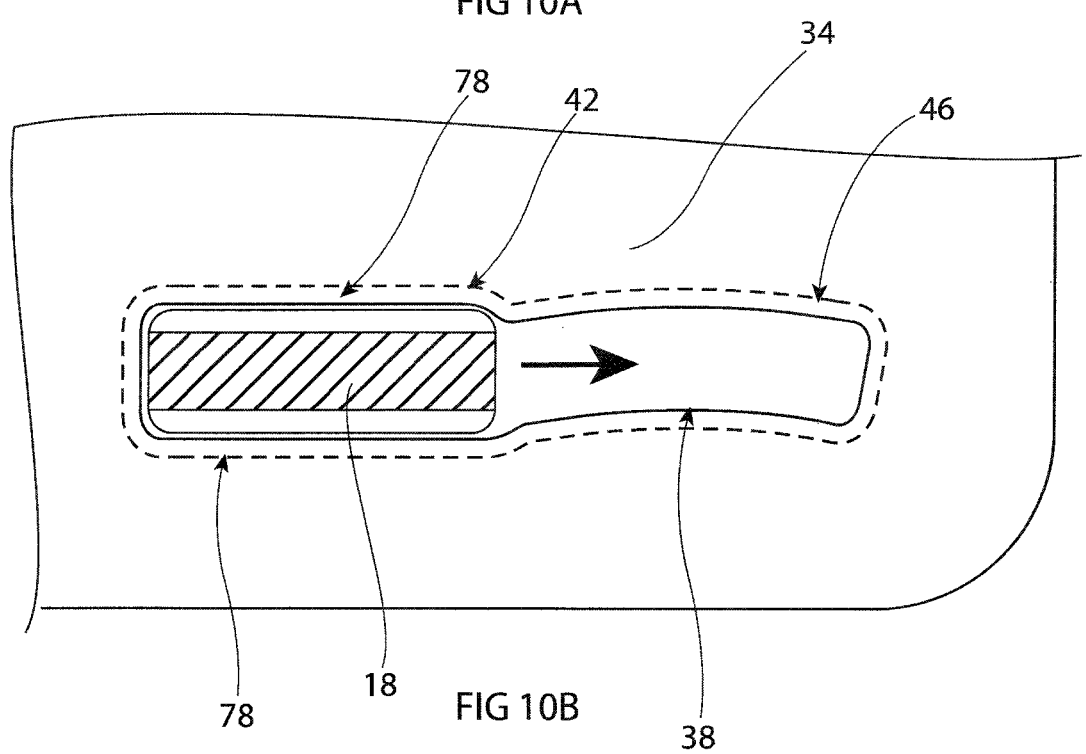
FIG. 10B shows a partial cross-sectional view of the panel, slot, and tab.

FIG. 10B shows a cross-sectional view of the furniture joint resulting from the slot 38 from FIG. 10A. This shows the additional (and unused) inclined faces 78 around the open insertion section 42 where the tab 18 enters the slot 38, a side effect of manufacturing the slot with only a single bit.

Figure 11A:
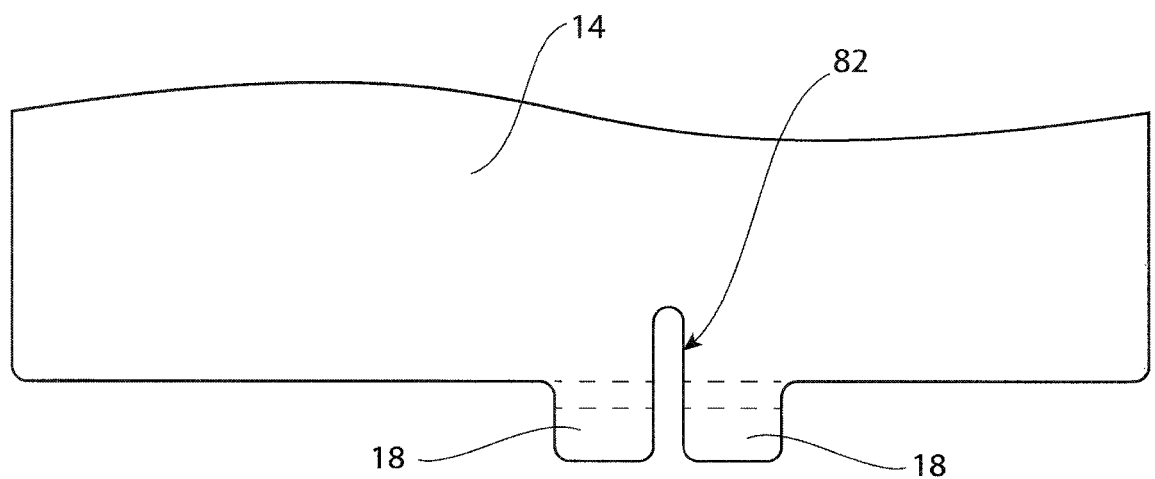
FIG. 11A shows a side view drawing of a panel and tab.
Figure 11B:
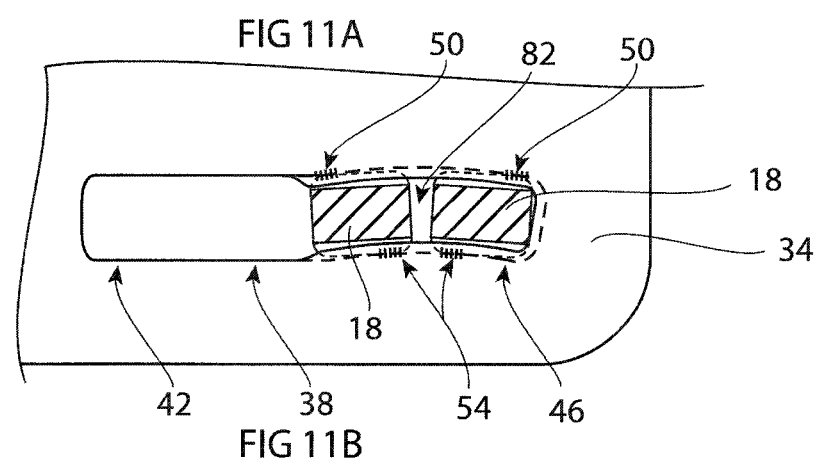
FIG. 11B shows a cross-sectional view of the panel, slot, and tab.

FIG. 11A shows a drawing of the first panel 14 where the dovetail tab 18 has been formed with a slit 82 cut through the middle of the tab 18. As shown, the slit 82 may extend into the body of the first panel 14. This may be viewed as separating the tab 18 into a pair of tabs 18, but the tab 81 is inserted into a single slot 38 and held in a single retention section 46. FIG. 11B shows a cross-sectional top view of a furniture joint with the cut tab 18 of FIG. 11A inserted into the slot 38 in the assembled configuration of the joint. The slit 82 dividing the tab 18 into separate pieces provides additional flexibility of the tab 18 and the tab 18 is more easily bent by the slot 38 as indicated. Similar to the manner discussed above, the slot 38 contacts the tab 18 with two separated contact points 50 on one side of the tab 18 and central contact points 54 on the opposite side of the tab 18. These points 50, 54 touch the tab 18 in the locations shown by the cross-hatch markings to hold the tab 18 in a bent configuration when the joint is in an assembled configuration. As an alternative to slit 82 cutting through the tab 18, the slit 82 may be disposed in the location shown in FIG. 11A and may only cut partially through the tab 18 instead of cutting completely through the tab 18. This would similarly provide an increase in the flexibility of the tab 18 and would function in the same manner.

Figure 12:
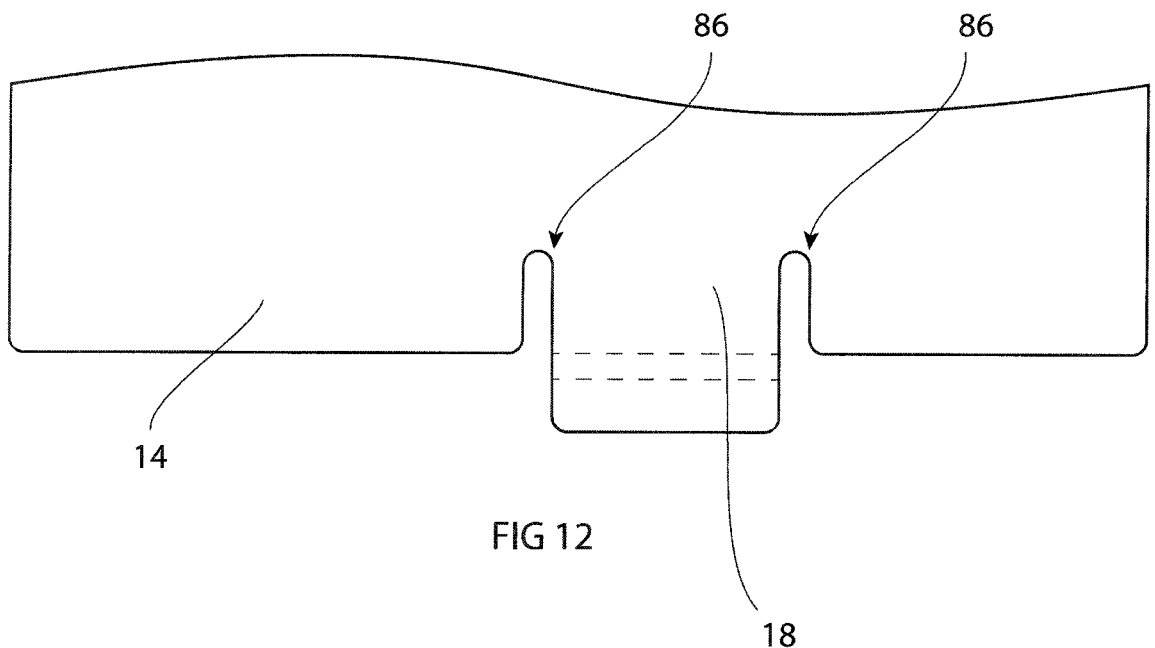
FIG. 12 shows a side view drawing of a panel and tab.

FIG. 12 shows a top view of the first panel 14 where the first panel 14 is formed with slits 86 which extend upwardly into the first panel 14 along the sides of the tab 18. These slits 86 separate the tab 18 from the stiffness of the first panel 14 and increase the flexibility of the tab 18. The tab is able to bend more independently from the first panel 14. This tab 18 functions with slots 38 in the manner shown in the various drawings above. The slits 86 may cut completely through the first panel 14 or may alternatively cut partially through the first panel 14 to increase the flexibility of the tab 18 without significantly altering the cosmetic appearance of the first panel 14.

Figure 13:
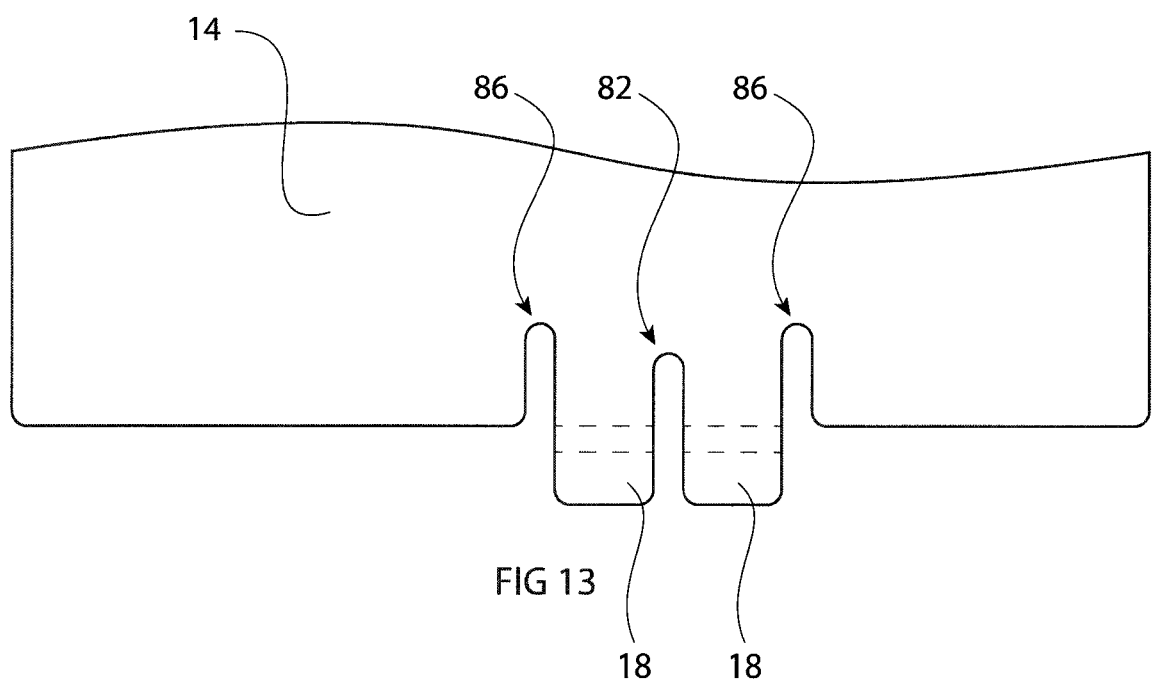
FIG. 13 shows a side view drawing of a panel and tab.

FIG. 13 shows a side view of the first panel 14 where the panel includes slits 86 cut upwardly into the first panel 14 along the sides of the tab 18 as well as a slit 82 cut through the middle of the tab 18. The slit 82 dividing the tab 18 into separate pieces provides additional flexibility of the tab 18 and the tab 18 is more easily bent by the slot 38. Additionally, the slits 86 separate the tab 18 from the stiffness of the first panel 14 and increase the flexibility of the tab 18. This first panel 14 thus combines the characteristics of the tabs shown in FIG. 11A and FIG. 12 and provides an additional degree of flexibility to the tab. The slits 82 and 86 may cut completely through the first panel 14 or may alternatively cut partially through the first panel 14 to increase the flexibility of the tab 18 without significantly altering the cosmetic appearance of the first panel 14.

The various slots 38 are shown as blind slots which do not penetrate completely through the second panel 34 to improve the cosmetic appearance of the second panel and resulting piece of furniture. The slots 38 may extend completely through the second panel 34 so that the bottom of the slot is roughly coincident with the bottom face of the second panel and so that the slots 38 are through slots. In some cases, this may be cosmetically desirable.

FIGS. 14 through 18 show different methods of manufacture which may be used to create the first panel and tab and the second panel and slot. The present invention is advantageous as is provides a structure which may be cheaply manufactured while still providing a strong and stable assembled article of modular furniture. Additionally, the methods of manufacturing the first and second panels accommodate the variation of thickness which is common in sheet goods. These variations in thickness have previously often required more expensive manufacturing or a degree of looseness in the furniture joints which are both undesirable. The furniture joint discussed herein avoids these.

Figure 14:
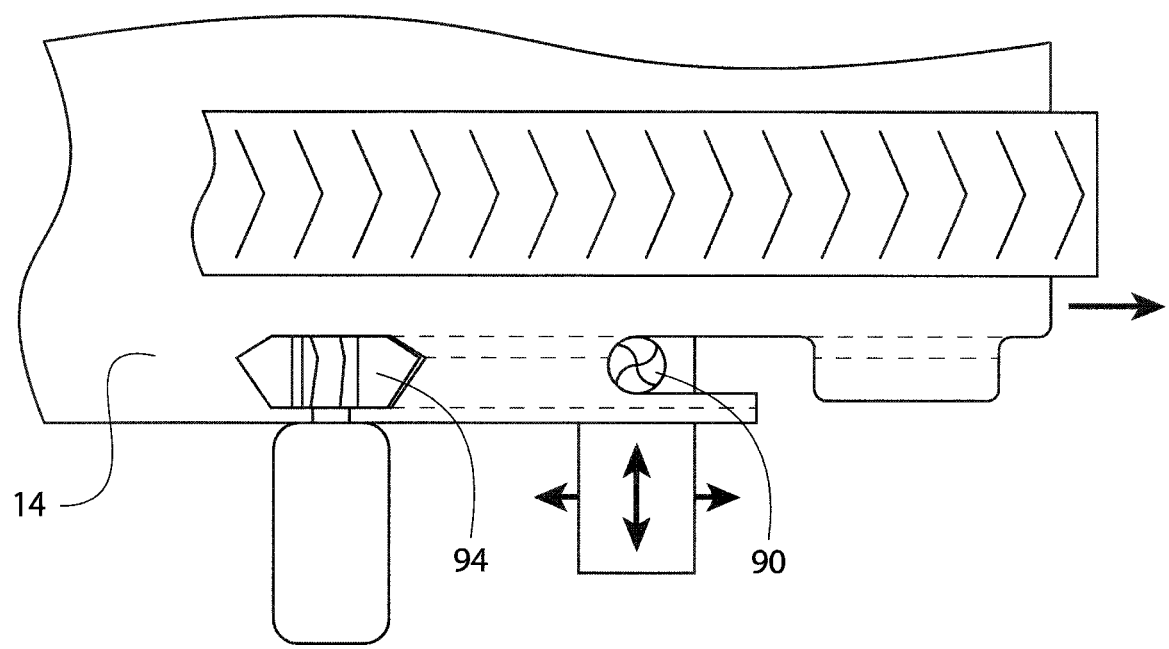
FIG. 14 shows a drawing which illustrates how the tab could be manufactured.
Figure 15:
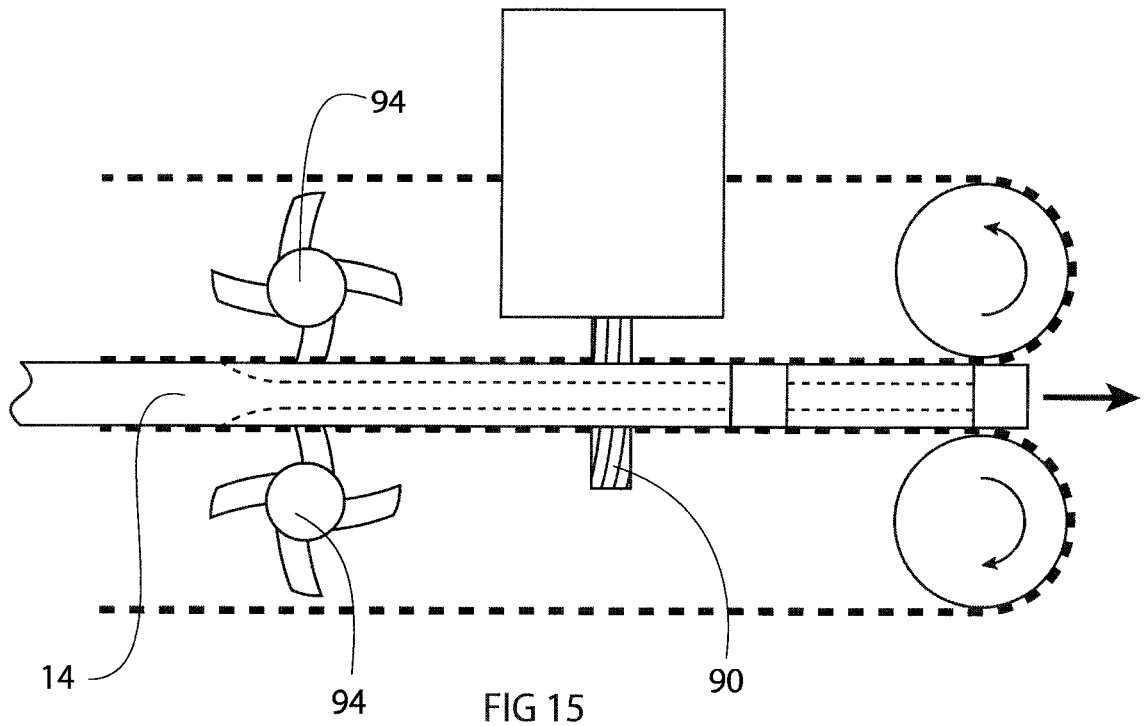
FIG. 15 shows a drawing which illustrates how the tab could be manufactured.

FIGS. 14 and 15 show a top view and side view of a potential method of manufacturing the wedge tab. A flat panel 14 is forced past a vertical-axis bit 90 and a (single or) pair of horizontal-axis bits 94. The horizontal-axis bits 94 are fixed, and cut the inclined faces on opposite sides of the wedge tab. The vertical-axis bit 90 can move in and out relative to the panel 14, allowing it to cut out the border of the tab from the panel as well as the finished edge of the panel. It can also move side to side, allowing it to create perpendicular cuts for tab edges without the conveyor belt which feeds the panel through the cutting machine having to stop. FIG. 15 shows the two horizontal-axis 94 bits and underneath the panel 14, cutting the inclined faces of the dovetail tab. These two horizontal-axis bits can mirror each other, or be different if an asymmetrical cut is desired. The conveyor feed belts are better shown which can move the panels through the cutting machine.

Figure 16A:
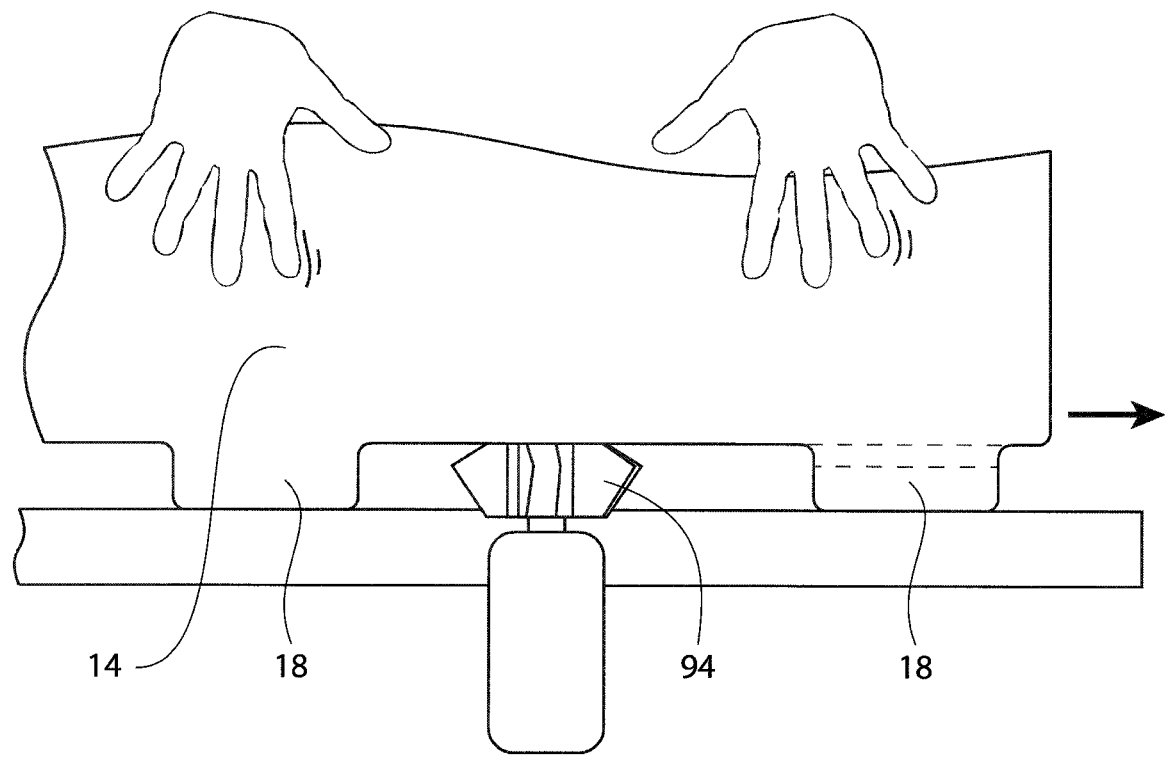
FIG. 16A shows a drawing which illustrates how the tab could be manufactured.
Figure 16B:
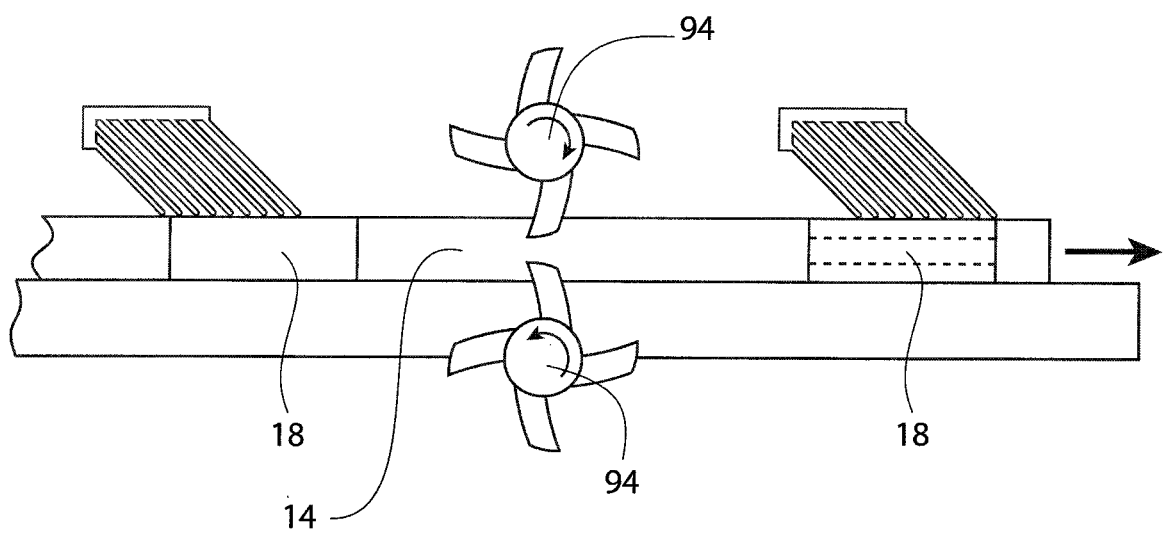
FIG. 16B shows a drawing which illustrates how the tab could be manufactured.

FIG. 16A shows a top view of an alternative method of manufacturing the double-side dovetail tab 18. With the edge of the panel 14 and tab 18 tab already cut out in an earlier process, the panel 14 is hand-fed past a horizontal-axis bit 94 which cuts the inclined face into the top of the tab. FIG. 16B shows a side view of the same manufacturing setup as seen in FIG. 16A. In addition to the features described in FIG. 16A, an additional horizontal-axis bit 94 is seen underneath the panel 14, cutting the inclined face into the opposite side the tab 18, while guards prevent kickback. These two horizontal-axis bits can mirror each other, or be different if an asymmetrical cut is desired.

Figure 17:
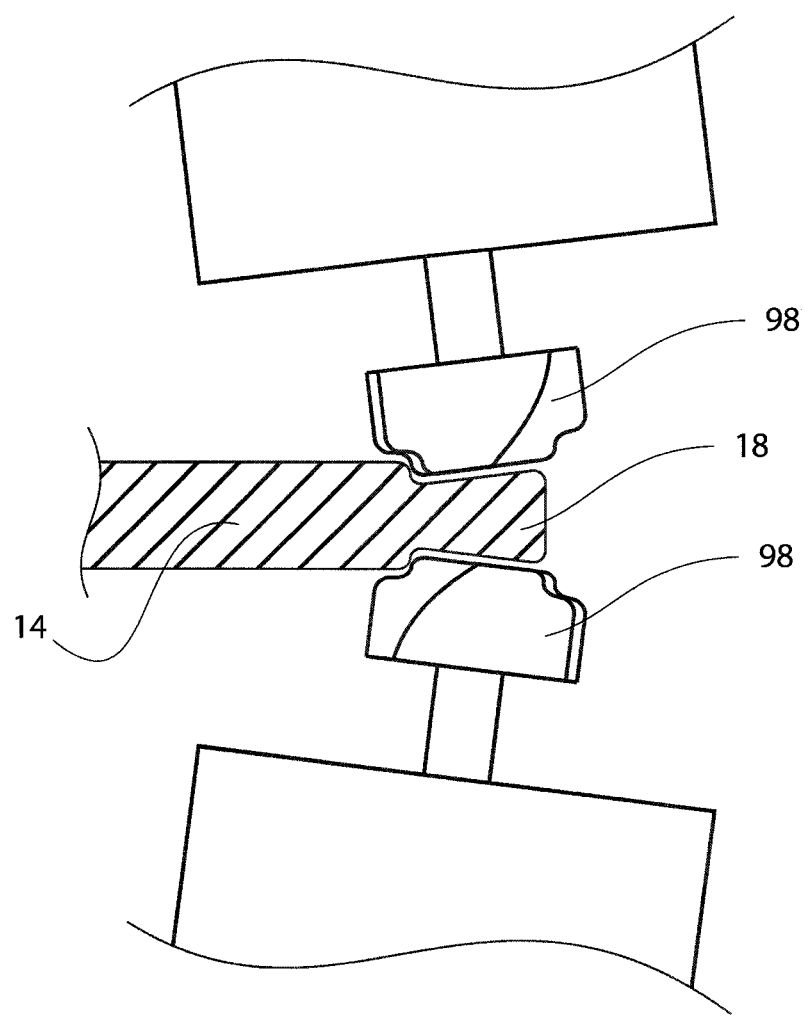
FIG. 17 shows a drawing which illustrates how the tab could be manufactured.

FIG. 17 shows a cross-sectional side view of an alternative method of manufacturing the tab 18. The panel 14 and tab 18 are fed past two angled-axis router bits 98 which cut the desired inclined faces into the tab. The two router bits can mirror each other across the center plane of the panel, or can be at different angles if an asymmetrical cut is desired.

Figure 18:
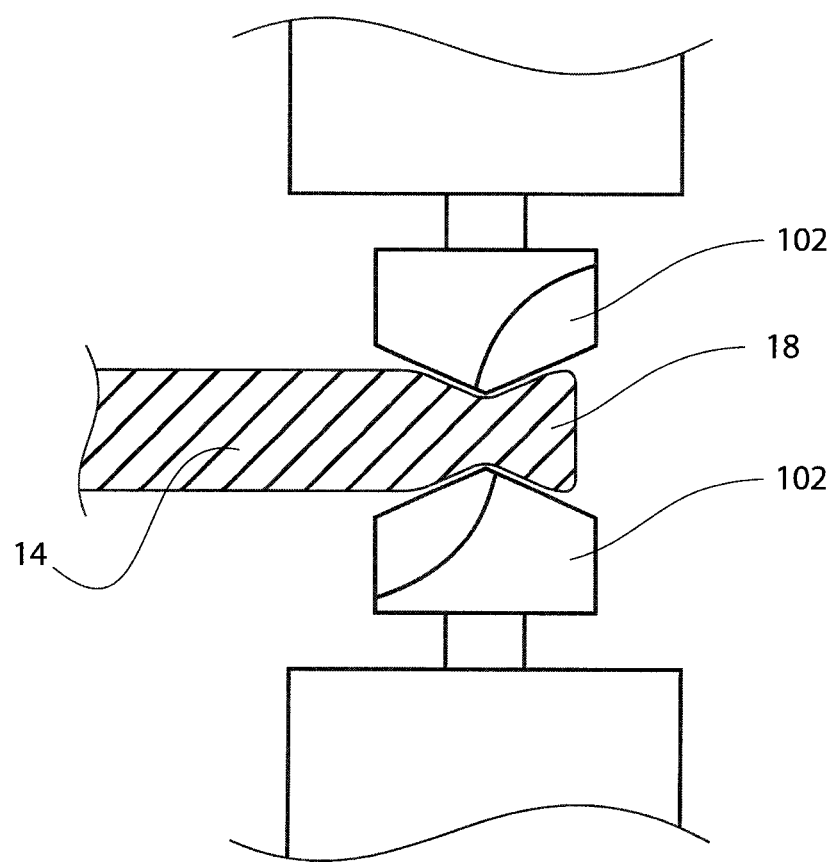
FIG. 18 shows a drawing which illustrates how the tab could be manufactured.

FIG. 18 shows a cross-sectional side view of an alternative method of manufacturing the tab 18. The tab 18 is fed past two vertical-axis V-bits 102 which cut the desired inclined faces into the tab. The two router bits 102 mirror each other across the center plane of the panel 14. To achieve a non-symmetric tab 18, the router bit V angles could be varied.

Figure 19:
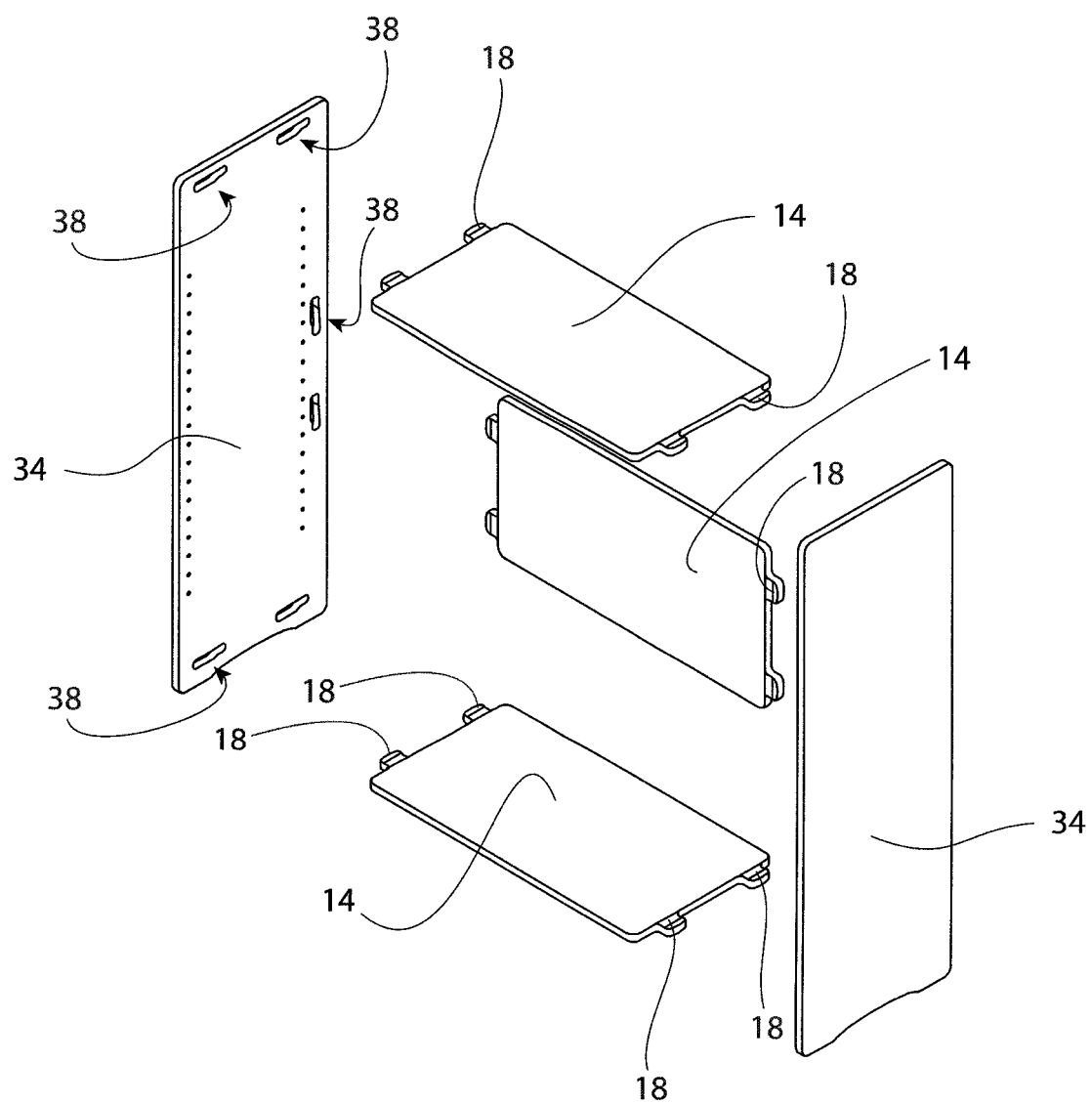
FIG. 19 shows an example article of furniture which illustrates how the tab and slot joint may be used in different items of modular furniture.
Figure 20:
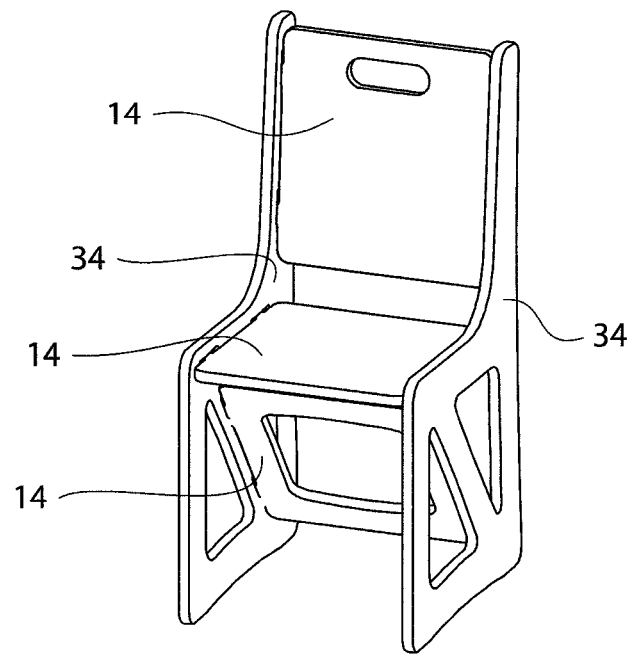
FIG. 20 shows an example article of furniture which illustrates how the tab and slot joint may be used in different items of modular furniture.
Figure 21:
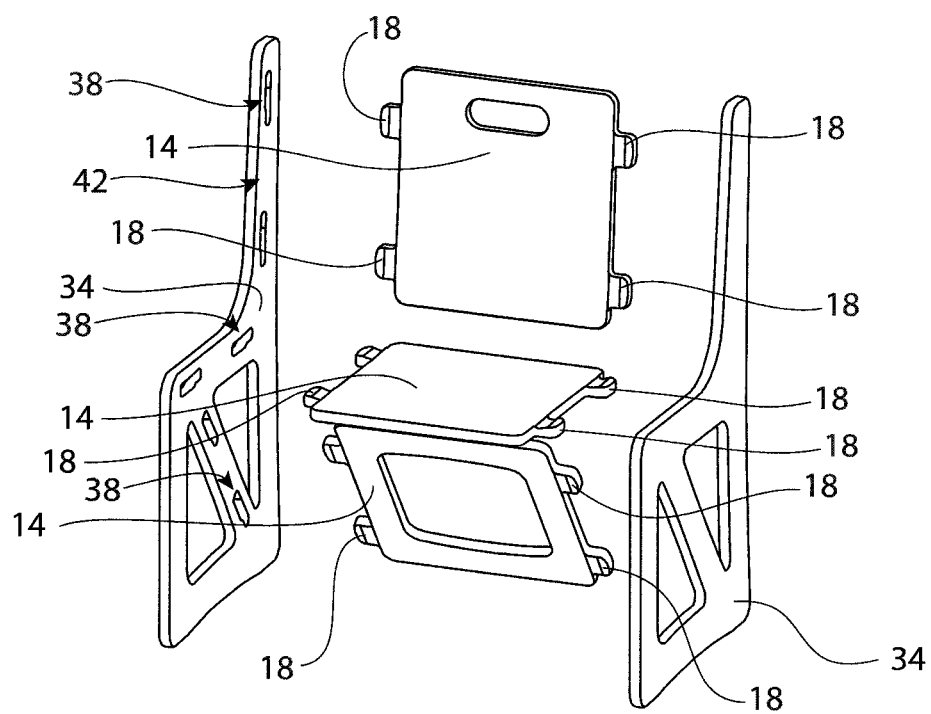
FIG. 21 shows an example article of furniture which illustrates how the tab and slot joint may be used in different items of modular furniture.
Figure 22:
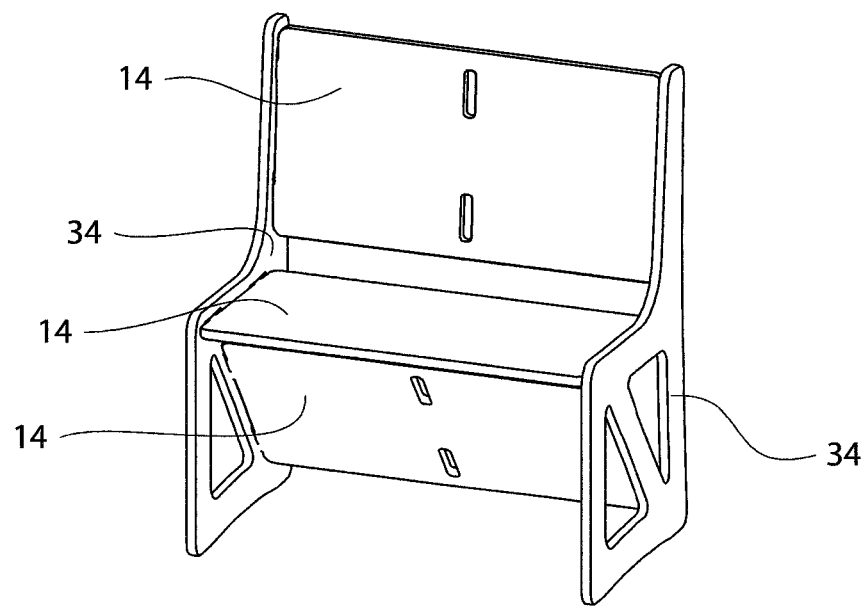
FIG. 22 shows an example article of furniture which illustrates how the tab and slot joint may be used in different items of modular furniture.
Figure 23:
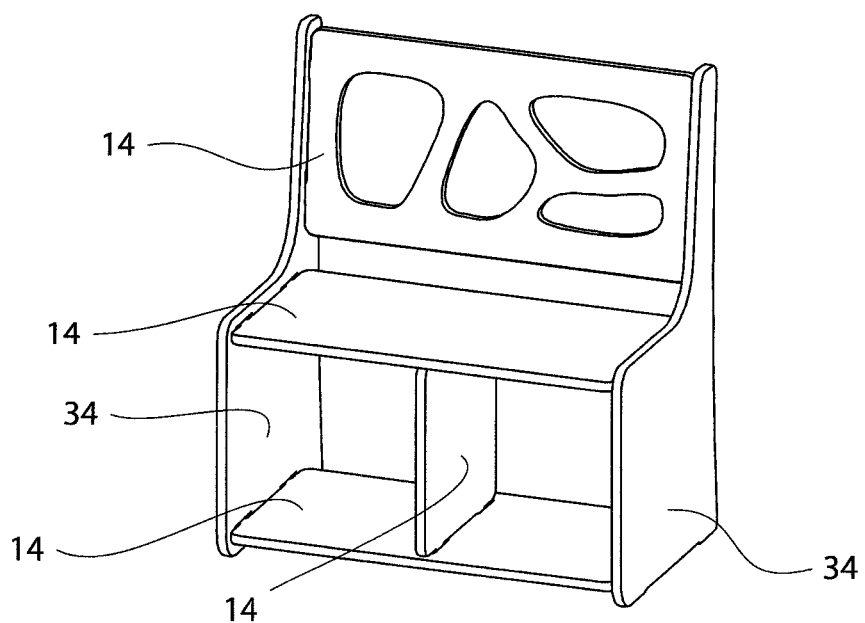
FIG. 23 shows an example article of furniture which illustrates how the tab and slot joint may be used in different items of modular furniture.

The joint can be used to create a variety of furniture pieces including case goods (bookshelves, dressers, night stands, cabinets) as well as other furniture such as chairs, tables, etc. The angle joint of FIG. 9 further extends the applicability by allowing non-perpendicular joints to be made between furniture panels. FIGS. 19 through 23 show a variety of different pieces of modular furniture for the purpose of illustrating how the dovetail tab and slot may be utilized in modular furniture. FIG. 19 illustrates how the dovetail tab 18 and slot 38 may be used to create a bookcase or other case or box based goods such as a drawer, chest, storage box, etc. The dovetail tabs 18 and slots 38 may be used between side panels 34 and any or all of intersecting panels 14.

FIGS. 20 through 23 illustrate how the dovetail tab 18 and slot 38 may be used to create a chair, bench, or other similar item of modular furniture. The dovetail tabs 18 and slots 38 may be used in joints between side panels 34 and back, seat, or brace panels 14. The dovetail tab 18 and slots 38 may be used between seat and brace panels and additional divider panels if desired. In each example item of modular furniture, one or more joints between intersecting panels may be made with the dovetail tab and slot joints disclosed herein to provide strength and rigidity to the resulting article of furniture.

An advantage of the furniture joint is that the joint achieves strength while allowing a blind joint. The slot need not extend through the second panel 34 and the resulting pieces of furniture are enhanced cosmetically because of the smooth and clean exterior panels. This is accomplished without increasing the complexity of assembly or reducing the strength of the piece of furniture.

It will be appreciated that the dovetail tab and slot joints are somewhat more constrained in their assembly than typical tab and slot joints. Accordingly, some items of modular furniture may become difficult to assemble if all joints are made with the dovetail tabs and slots. If this is not desired, an item of furniture may be made with some joints between panels that utilize the dovetail tabs and slots and with some other joints between different panels that utilize conventional tab and slot joints. The tab and slot joints of the present invention may thus be used in items of modular furniture to provide an improvement of stability, strength, and ease of assembly over prior art tab and slot joints.

To assemble a joint, the dovetail tab 18 is inserted into the open insertion side 42 of the slot 38 and is then slid towards the retention section 46 of the slot 38. The width of the slot 38 may be uniform and slightly wider than the tab 18 so that no resistance is met until the tab 18 reaches the retention section 46 of the slot 38. At the retention section 46 of the slot 38, the path of the slot 38 curves or bends, causing the unobstructed, straight-thru width of the slot 38 to be less than the thickness of the tab 18. Therefore, at the retention section 46 of the slot 38, the tab 18 has a few points of contact 50, 54 with the sides of the slot 38 and is held in a bent or twisted configuration when the item of modular furniture is in an assembled configuration.

The points of contact 50, 54 between the tab 18 and slot 38 cause the tab 18 to bend or flex. This creates a deformation which is primarily elastic rather than plastic (crushing). The resistance of the tab 18 to flexing creates friction which prevents the joint from coming apart without the proper application of force. As elastic deformation is temporary, the item of furniture is more resilient to being assembled and disassembled multiple times without losing stiffness in the final article of furniture.

Manufacturing or material variation (e.g. variation in the thickness of the panels) may cause a required deformation of the tab which is greater or lesser than the calculated elastic deformation. For these cases, the flexing of the tab compensates for the variation and requires less extra force than crushing the tab would in prior art designs. This makes the joint less susceptible to loss of stability due to manufacturing or environmental factors. Splitting or slitting the tab further increases the flexibility and decreases susceptibility to variation.

One benefit of this joint is that the tabs can be made on inline processing equipment rather than a CNC router, as CNC routers are usually slower and requires more handling. Fast processes, such as beam saws, for initially shaping and sizing the part can be used. The tab shaping can then be done on a belt machine. Lower technical processes, such as a hand-fed machine can also be used, achieving high reliability while requiring less capital investment.

Another advantage of the dovetail tab and slot is that the tabbed parts can be designed so that they are inserted into the slots in either direction (e.g. without regard to which end of a first panel 14 is inserted into a particular second panel 34). This eliminates end user confusion about the direction that a tabbed panel is inserted into a slotted panel and facilitates easy assembly of the piece of furniture.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A piece of furniture having a joint comprising:
a first furniture piece having a tab extending from an edge thereof, the tab comprising a first side and a second side opposite the first side;
a second furniture piece having a slot formed therein;
wherein the slot has an insertion section which receives the tab into the slot;
wherein the slot has a retention section which receives the tab when the first furniture piece and the second furniture piece are in an assembled configuration;
wherein the retention section is non-linear along a length thereof comprising a first side with a first contact point which contacts the first side of the tab at a first location and a second contact point which contacts the first side of the tab at a second location which is spaced apart from the first location, the retention section comprising a second side with a third contact point which contacts the second side of the tab at a third location between the first location and the second location such that the tab is maintained in an elastically bent configuration by contact with the first contact point, second contact point, and third contact point when the first furniture piece and the second furniture piece are in an assembled configuration.

2. The piece of furniture of claim 1, wherein a face of the tab is angled such that a distal end of the tab is thicker than a proximal neck of the tab which is attached to the furniture piece, and wherein the slot has an angled side wall which is complementary to the angled face of the tab such that a distal width of the slot is greater than a proximal width of the slot.

3. The piece of furniture of claim 1, wherein the tab comprises a slot extending from a distal end of the tab inwardly towards the first furniture piece at a position between the first location and the second location, wherein the third location is located adjacent the slot, and wherein the third contact point contacts the tab at a fourth location adjacent the slot.

4. The piece of furniture of claim 1, wherein the retention section of the slot is curved along a length thereof and wherein the first contact point and second contact point are located on a concave side of the slot and wherein the third contact point is located on a convex side of the slot.

5. The piece of furniture of claim 1, wherein the retention section of the slot comprises an angular bend along the length thereof and wherein the first contact point and second contact point are located on a concave side of the slot and wherein the third contact point is located on a convex side of the slot.

6. The piece of furniture of claim 1, wherein the tab comprises a slot extending from a distal end of the tab at a position adjacent a center of the tab and between the first location and the second location inwardly towards the first furniture piece.

7. The piece of furniture of claim 1, wherein the first furniture piece is a first panel and wherein the first panel further comprises a first slot which extends from a position adjacent a first edge of the tab into the first panel and a second slot which extends from a position adjacent a second edge of the tab into the first panel, wherein the first location is located near the first slot and wherein the second location is located near the second slot.

8. The piece of furniture of claim 1, wherein the insertion section of the slot is an opening on an edge of the second furniture piece.

9. The piece of furniture of claim 1, wherein the insertion section of the slot is an enlarged section of the slot which is open to a face of the second furniture piece.

10. The piece of furniture of claim 1, wherein the slot further comprises a transition section between the insertion section and retention section of the slot which gradually reduces a width of the slot between the insertion section and the retention section.

11. The piece of furniture of claim 1, wherein the first furniture piece comprises a second tab, the second furniture piece comprises a second slot, and the second tab is disposed in the second slot when the first furniture piece and the second furniture piece are in the assembled configuration.

12. A piece of furniture having a joint comprising:
a first panel having a tab extending from an edge thereof;
   wherein the tab comprises a first side and a second side opposite the first side;
   wherein a face of the tab is angled such that a distal free end of the tab is thicker than a proximal neck of the tab which is attached to the panel;
a second panel having a slot formed therein;
   wherein the slot has an angled side wall which is complementary to the angled face of the tab such that a distal width of the slot is greater than a proximal width of the slot;
   wherein the slot has an insertion section which receives the tab into the slot;
   wherein the slot has a retention section which receives the tab when the first panel and the second panel are in an assembled configuration;
   wherein the retention section of the slot comprises a first side with a first contact point which contacts the first side of the tab at a first location and a second contact point which contacts the first side of the tab at a second location which is spaced apart from the first location and wherein the retention section of the slot comprises a second side with a third contact point which contacts the second side of the tab at a third location between the first location and the second location such that the tab is maintained in an elastically bent configuration by contact with the first contact point, second contact point, and third contact point when the first panel and the second panel are in the assembled configuration.

13. The piece of furniture of claim 12, wherein the tab comprises a slot extending from the distal end of the tab inwardly towards the first furniture piece at a position between the first location and the second location, wherein the third location is located adjacent the slot, and wherein the third contact point contacts the tab at a fourth location adjacent the slot.

14. The piece of furniture of claim 12, wherein the retention section of the slot is curved along a length thereof and wherein the first contact point and second contact point are located on a concave side of the slot and wherein the third contact point is located on a convex side of the slot.

15. The piece of furniture of claim 12, wherein the retention section of the slot comprises an angular bend along the length thereof and wherein the first contact point and second contact point are located on a concave side of the slot and wherein the third contact point is located on a convex side of the slot.

16. The piece of furniture of claim 12, wherein the tab comprises a slot extending from the distal end of the tab at a position between the first location and the second location inwardly towards the first panel.

17. The piece of furniture of claim 12, wherein the first panel further comprises a first slot which extends from a position adjacent a first edge of the tab into the first panel and a second slot which extends from a position adjacent a second edge of the tab into the first panel, wherein the first location is located near the first slot and wherein the second location is located near the second slot.

18. The piece of furniture of claim 12, wherein the first panel comprises a second tab, the second panel comprises a second slot, and the second tab is disposed in the second slot when the first panel and the second panel are in the assembled configuration.

19. A piece of furniture having a joint comprising:
a first panel having a tab extending from an edge thereof;
   wherein the tab comprises a first side and a second side opposite the first side;
a second panel having a slot formed therein;
   wherein the slot has an insertion section which receives the tab into the slot;
   wherein the slot has a retention section which receives the tab when the first panel and the second panel are in an assembled configuration;
   wherein the retention section of the slot comprises a first side with a first contact point which contacts the first side of the tab at a first location and a second contact point which contacts the first side of the tab at a second location which is spaced apart from the first location and wherein the retention section of the slot comprises a second side with a third contact point which contacts the second side of the tab at a third location between the first location and the second location such that the tab is maintained in an elastically bent configuration by contact with the first contact point, second contact point, and third contact point when the first panel and the second panel are in the assembled configuration.

20. The piece of furniture of claim 19, wherein the tab comprises a slot extending from the distal end of the tab inwardly towards the first furniture piece at a position between the first location and the second location, wherein the third location is located adjacent the slot, and wherein the third contact point contacts the tab at a fourth location adjacent the slot.

* * * * *